United States Patent
Prabhakara et al.

(10) Patent No.: US 10,404,526 B2
(45) Date of Patent: Sep. 3, 2019

(54) METHOD AND SYSTEM FOR GENERATING RECOMMENDATIONS ASSOCIATED WITH CLIENT PROCESS EXECUTION IN AN ORGANIZATION

(71) Applicant: Conduent Business Services, LLC, Dallas, TX (US)

(72) Inventors: Jagadeesh Chandra Bose Rantham Prabhakara, Chittoor (IN); Avantika Gupta, Vrindavan (IN); Deepthi Chander, Cochin (IN); Ajith Ramanath, Bangalore (IN); Koustuv Dasgupta, Bangalore (IN); Ashish Garg, Ghaziabad (IN)

(73) Assignee: Conduent Business Services, LLC, Florham Park, NJ (US)

( * ) Notice: Subject to any disclaimer, the term of this patent is extended or adjusted under 35 U.S.C. 154(b) by 115 days.

(21) Appl. No.: 15/270,402

(22) Filed: Sep. 20, 2016

(65) Prior Publication Data
US 2018/0083825 A1 Mar. 22, 2018

(51) Int. Cl.
*H04L 12/24* (2006.01)

(52) U.S. Cl.
CPC .......... *H04L 41/065* (2013.01); *H04L 41/069* (2013.01); *H04L 41/5019* (2013.01)

(58) Field of Classification Search
CPC . H04L 41/065; H04L 41/5019; H04L 41/069; G06Q 10/04; G06Q 10/06; G06Q 10/0633
See application file for complete search history.

(56) References Cited

U.S. PATENT DOCUMENTS

| | | |
|---|---|---|
| 8,321,251 B2 | 11/2012 | Opalach et al. |
| 8,489,444 B2 | 7/2013 | Bhaskaran et al. |
| 2004/0260591 A1 | 12/2004 | King |

(Continued)

OTHER PUBLICATIONS

Rozinat, A., van der Aalst, W.M.P.: Conformance Checking of Processes Based on Monitoring Real Behavior. Information Systems 33(1), 64-95 (2008).

(Continued)

*Primary Examiner* — Michael A Keller
*Assistant Examiner* — Jsing Forng Lin
(74) *Attorney, Agent, or Firm* — Jones Robb, PLLC

(57) ABSTRACT

The disclosed embodiments illustrate methods and systems for generating recommendations for client process execution of one or more client processes corresponding to a plurality of clients of an organization. The method comprises retrieving an event log including event data captured during execution of one or more processes in the organization to service a plurality of clients of a predefined type. The event log is analyzed across the plurality of clients to determine cross-clientele information including a process compliance deviation between an observed and an expected client process execution of the one or more processes. Thereafter, a set of root-causes of the process compliance deviation is determined based on process models of the one or more processes and/or decision rules of the organization. Further, one or more recommendations for the client process execution of the one or more processes of the organization are generated, based on the set of root-causes.

20 Claims, 10 Drawing Sheets

(56) References Cited

U.S. PATENT DOCUMENTS

| | | | | |
|---|---|---|---|---|
| 2007/0179822 | A1* | 8/2007 | Benayon | G06Q 10/04 705/70 |
| 2008/0209030 | A1* | 8/2008 | Goldszmidt | H04L 29/06 709/224 |
| 2008/0262887 | A1* | 10/2008 | Guthrie | G06Q 10/04 705/7.27 |
| 2008/0300950 | A1* | 12/2008 | Bhaskaran | G06Q 10/06 705/7.27 |
| 2008/0312992 | A1* | 12/2008 | Hoshi | G06Q 10/04 705/7.27 |
| 2009/0157448 | A1* | 6/2009 | Malkin | G06Q 10/04 705/7.27 |
| 2010/0050023 | A1* | 2/2010 | Scarpelli | G06F 11/0709 714/46 |
| 2014/0188547 | A1* | 7/2014 | Nakazato | G06Q 10/00 705/7.27 |
| 2014/0279769 | A1* | 9/2014 | Goodwin | G06N 5/022 706/14 |
| 2017/0076244 | A1* | 3/2017 | Bastide | G06F 17/30604 |

OTHER PUBLICATIONS

Adriansyah, A., van Dongen, B.F., van der Aalst, W.M.P.: Conformance Checking Using Cost-Based Fitness Analysis. In: Proceedings of the 15th IEEE International Enterprise Distributed Object Computing Conference (EDOC). pp. 55-64 (2011).

Maggi, F.M., Montali, M., Westergaard, M., van der Aalst, W.M.P.: Monitoring Business Constraints with Linear Temporal Logic: An Approach Based on Colored Automata. In: Business Process Management. Lecture Notes in Computer Science, vol. 6896, pp. 132-147 (2011).

van der Aalst, W.M.P., Beer, H.T.D., van Dongen, B.F.: Process mining and verification of properties: An approach based on temporal logic. Springer (2005).

Weijters, A.J.M.M., van der Aalst, W.M.P.: Rediscovering Workow Models From Event-based Data Using Little Thumb. Integrated Computer-Aided Engineering 10(2), 151-162 (2003).

van der Aalst, W.M.P., Adriansyah, A., van Dongen, B.F.: Replaying History on Process Models for Conformance Checking and Performance Analysis. Wiley Inter-disciplinary Reviews: Data Mining and Knowledge Discovery 2(2), 182-192 (2012).

CoSeLoG: http://www.win.tue.nl/coselog/wiki/project#the_project (2014) 7. van Dongen, B.F., van der Aalst, W.M.P.: A Meta Model for Process Mining Data. In: Proceedings of the CAiSEWorkshops (EMOI-INTEROPWorkshop). vol. 2, pp. 309-320 (2005).

Nguyen, H., Dumas, M., Rosa, M.L., Maggi, F.M., Suriadi, S.: Mining business process deviance: A quest for accuracy. In: On the Move to Meaningful Internet Systems: OTM 2014 Conferences, Lecture Notes in Computer Science, vol. 8841, pp. 436-445 (2014).

Pika, A., van der Aalst, W.M.P., Fidge, C.J., ter Hofstede, A.H.M., Wynn, M.T.: Predicting deadline transgressions using event logs. In: Business Process Management Workshops, Lecture Notes in Business Information Processing, vol. 132, pp. 211-216 (2013).

Verbeek, H.M.W., Buijs, J.C.A.M., Dongen, B.F.V., van der Aalst, W.M.P.: ProM6: The Process Mining Toolkit. Proc. of BPM Demonstration Track 615, 34-39(2010).

Suriadi, S., Ouyang, C., van der Aalst, W.M.P., ter Hofstede, A.H.M.: Root cause analysis with enriched process logs. In: Business Process Management Workshops, Lecture Notes in Business Information Processing, vol. 132, pp. 174-186 (2013).

Buijs, J.C.A.M., van Dongen, B.F., van der Aalst, W.M.P.: Towards cross-organizational process mining in collections of process models and their executions. In: Business Process Management Workshops, Lecture Notes in Business Information Processing, vol. 100, pp. 2-13 (2012).

Ferreira, D.R., Vasilyev, E.: Using logical decision trees to discover the cause of process delays from event logs. Computers in Industry 70, 194-207 (Jun. 2015).

\* cited by examiner

| CASE ID 502 | TASK ID 504 | TYPE 506 | RESOURCE 508 | TIMESTAMP 510 | COST 512 | REVENUE 514 |
|---|---|---|---|---|---|---|
| ... | ... | ... | ... | ... | ... | ... |
| CASE i | TRANSACTION | START | SYSTEM | 2016-03-05 10:02:36 IST | 0 USD | 0 USD |
| CASE i+1 | TRANSACTION | START | SYSTEM | 2016-03-05 10:02:36 IST | 0 USD | 0 USD |
| CASE i | TRANSACTION | ASSIGN | ADMIN | 2016-03-05 10:05:08 IST | 0 USD | 0 USD |
| CASE i+1 | TRANSACTION | ASSIGN | ADMIN | 2016-03-05 10:05:08 IST | 0 USD | 0 USD |
| CASE i | TRANSCRIPTION PROCESS | START | JOHN | 2016-03-05 10:08:08 IST | 0.5 USD | 0 USD |
| CASE i+1 | TRANSCRIPTION PROCESS | START | JANE | 2016-03-05 10:09:28 IST | 0.5 USD | 0 USD |
| CASE i+1 | TRANSCRIPTION PROCESS | SUSPEND | JANE | 2016-03-05 10:15:04 IST | 0 USD | 0 USD |
| CASE i+1 | TRANSCRIPTION PROCESS | RESUME | JANE | 2016-03-05 10:17:34 IST | 0 USD | 0 USD |
| CASE i | TRANSCRIPTION PROCESS | COMPLETE | JOHN | 2016-03-05 10:19:28 IST | 0 USD | 0.6 USD |
| CASE i | AUDIT | START | MIKE | 2016-03-05 10:20:58 IST | 0.05 USD | 0 USD |
| CASE i | AUDIT | COMPLETE | MIKE | 2016-03-05 10:22:52 IST | 0 USD | 0.02 USD |
| CASE i | TRANSACTION | COMPLETE | SYSTEM | 2016-03-05 10:23:07 IST | 0 USD | 0 USD |
| CASE i+1 | TRANSCRIPTION PROCESS | COMPLETE | JANE | 2016-03-05 10:25:37 IST | 0 USD | 0.6 USD |
| CASE i+1 | AUDIT | START | MIKE | 2016-03-05 10:28:49 IST | 0.05 USD | 0 USD |
| CASE i+1 | AUDIT | COMPLETE | MIKE | 2016-03-05 10:28:49 IST | 0 USD | 0.02 USD |
| CASE i+1 | TRANSACTION | COMPLETE | SYSTEM | 2016-03-05 10:28:49 IST | 0 USD | 0 USD |
| ... | ... | ... | ... | ... | ... | ... |

FIG. 5

| DEVIATIONS | CLIENT-PROCESSES | NO. OF TRANSACTIONS |
|---|---|---|
| TRANSACTION PROCESSING IS ASSIGNED TO DIFFERENT RESOURCES | (C2, P2) | 1 |
| | (C3, P1) | 2 |
| TRANSACTION AUDITING IS PERFORMED BY DIFFERENT RESOURCES | (C2, P1) | 1 |
| | (C4, P3) | 3 |
| TRANSACTION AUDITING IS PERFORMED AFTER TRANSACTION IS COMPLETED | (C1, P2) | 2 |
| | (C2, P1) | 4 |
| | (C4, P1) | 3 |
| TRANSACTION PROCESSING IS EXECUTED MORE THAN ONCE DUE TO QUALITY ISSUES | (C1, P2) | 2 |
| | (C1, P3) | 3 |
| | (C2, P3) | 5 |
| | (C2, P4) | 1 |
| | (C3, P3) | 4 |
| | (C4, P2) | 12 |
| TRANSACTION IS ABORTED AFTER RESOURCES COMPLETE TRANSACTION PROCESSING | (C2, P2) | 2 |
| | (C4, P4) | 3 |

FIG. 8

METHOD AND SYSTEM FOR GENERATING RECOMMENDATIONS ASSOCIATED WITH CLIENT PROCESS EXECUTION IN AN ORGANIZATION

TECHNICAL FIELD

The presently disclosed embodiments are related, in general, to process execution in an organization. More particularly, the presently disclosed embodiments are related to methods and systems for generating recommendations associated with process execution in an organization.

BACKGROUND

Service-sector organizations, such as service providers, are trained to serve a set of processes within different domains across a large number of clients. Certain Service Level Agreements (SLAs) are required to be met by the Service-sector organizations by use of a service delivery network for performance quantification. Mostly, the performance of the service-sector organizations may be challenged by various factors, such as inefficient processes, complex workflows, tighter costs, and stringent compliance requirements.

To overcome such challenges, a service-sector organization records event data associated with clients and their processes to gain insights on process execution, by use of various process mining techniques. In certain scenarios, the service-sector organization may serve a standard set of processes within different domains across various clients. Though there may be certain commonalities within similar processes across various clients, however, each such may have its own specifications with respect to such similar processes. Accordingly, the operational key performance indicators (KPIs) of the service-sector organization across such clients may be dissimilar even for such similar processes. This dissimilarity in process performance may be attributed to various factors, such as variations in workflow design, resource allocation, context dependencies, and/or skill deficiencies. For example, two clients that require a similar process, such as a document verification, to be executed, may incur different turnaround times for process completion. In certain scenarios, this may result in the service-sector organization meeting SLAs for one set of clients, and violating those of other sets of clients, despite the similarity in processes. Thus, there is a need to gain insights for such variance in performance and optimize the execution of the processes across the multiple clients serviced by the organizations.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for recommending a client process execution based on event log data pertaining to execution of one or more client processes corresponding to a plurality of clients of an organization. The method may include retrieval of an event log from a memory device, by one or more processors. The event log may include data associated with one or more events captured during execution of one or more processes in the organization. The one or more processes may correspond to services provided by the organization to a plurality of clients of a predefined type. Further, the method may include analysis of the retrieved event log across the plurality of clients of the predefined type, by the one or more processors. Based on the analysis of the event log across the plurality of clients, cross-clientele information associated with the one or more processes may be determined. The cross-clientele information may include at least a process compliance deviation between observed and expected client process execution of the one or more processes. The method may further include determination of a set of root-causes associated with the process compliance deviation of the one or more processes, by the one or more processors. The set of root-causes may be determined based on at least one or more process models of the one or more processes and/or one or more decision rules associated with the organization. In addition, the method may include generation of one or more recommendations for the client process execution of the one or more processes of the organization, based on the determined set of root-causes, by the one or more processors.

According to embodiments illustrated herein, there is provided a system for recommending a client process execution based on event log data pertaining to execution of one or more client processes corresponding to a plurality of clients of an organization. The system includes one or more processors configured to retrieve an event log from a memory device. The event log may include data associated with one or more events captured during execution of one or more processes in the organization. The one or more processes may correspond to services provided by the organization to a plurality of clients of a predefined type. Further, the one or more processors may be configured to analyze the retrieved event log across the plurality of clients of the predefined type. Based on the analysis of the event log across the plurality of clients, cross-clientele information associated with the one or more processes may be determined. The cross-clientele information may include at least a process compliance deviation between observed and expected client process execution of the one or more processes. The one or more processors may be further configured to determine a set of root-causes associated with the process compliance deviation of the one or more processes. The set of root-causes may be determined based on at least one or more process models of the one or more processes and/or one or more decision rules associated with the organization. In addition, the one or more processors may be further configured to generate one or more recommendations for the client process execution of the one or more processes of the organization, based on the determined set of root-causes.

According to embodiments illustrated herein, there is provided a computer program product for use with a computing device. The computer program product comprises a non-transitory computer readable medium storing a computer program code for recommending a client process execution based on event log data pertaining to execution of one or more client processes corresponding to a plurality of clients of an organization. The computer program code is executable by one or more processors in the computing device to retrieve an event log from a memory device. The event log may include data associated with one or more events captured during execution of one or more processes in the organization. The one or more processes may correspond to services provided by the organization to a plurality of clients of a predefined type. The computer program code is further executable by the one or more processors to analyze the retrieved event log across the plurality of clients of the predefined type. Based on the analysis of the event log across the plurality of clients, cross-clientele information associated with the one or more processes may be determined. The cross-clientele information may include at least a process compliance deviation between observed and expected client process execution of the one or more processes. The computer program code is further executable by the one or more processors to determine a set of root-causes associated with the process compliance deviation of the one or more processes. The set of root-causes may be determined based on at least one or more process models of the one or more processes and/or one or more decision rules associated with the organization. In addition, the computer program code is further executable by the one or more processors to generate one or more recommendations for the client process execution of the one or more processes of the organization, based on the determined set of root-causes.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which:

FIG. 5 illustrates an exemplary event log of one or more processes that may be executed in an organization to service a plurality of clients of a predefined type, in accordance with at least one embodiment;

FIG. 8 illustrates exemplary deviations in client process execution of one or more processes, which may be determined based on compliance analysis of an event log across a plurality of clients, in accordance with an embodiment.

DETAILED DESCRIPTION

Figure 1:
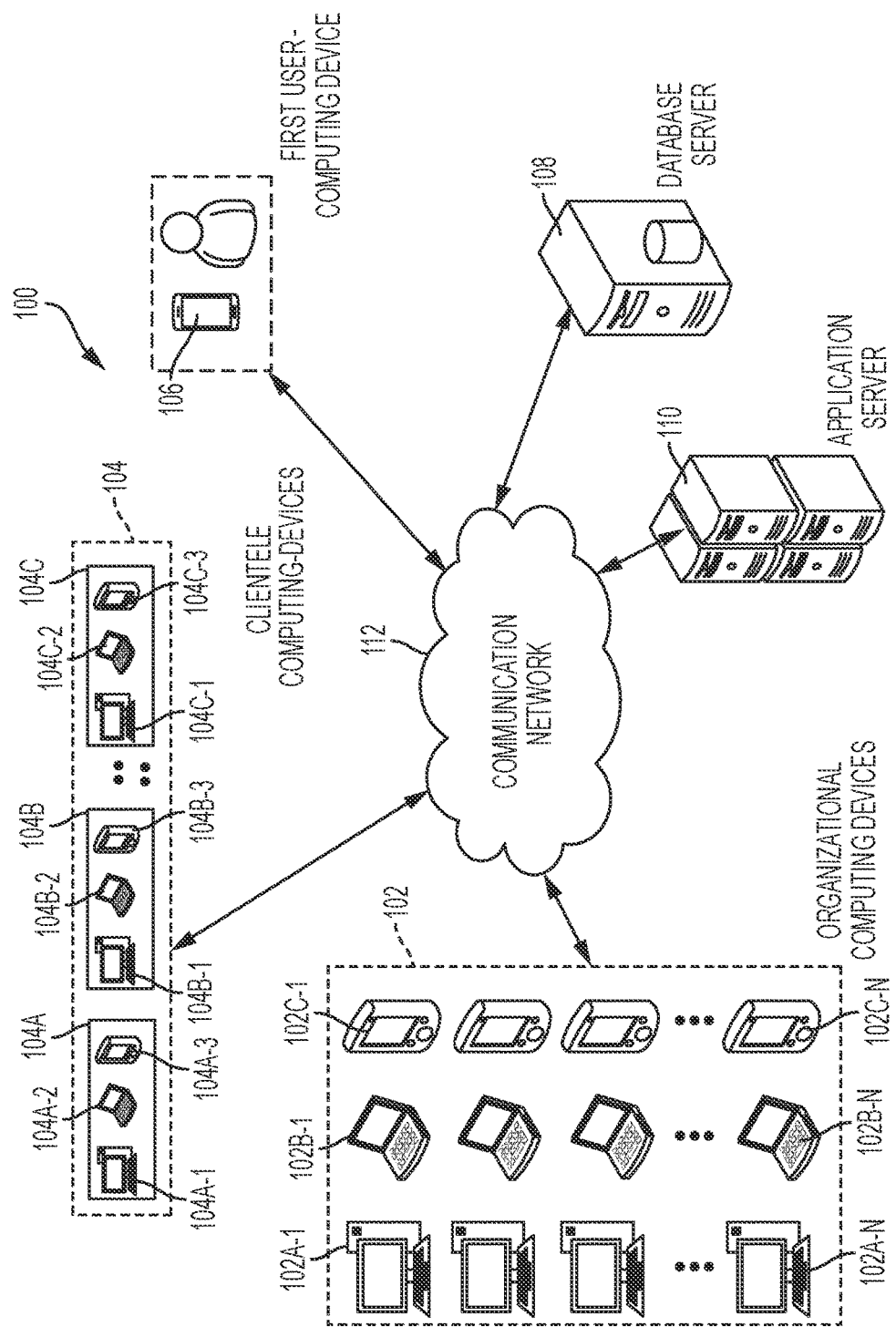
FIG. 1 is a block diagram of a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes one or more processors/microcontrollers and/or any other electronic components, a device, or a system that performs one or more operations according to one or more programming instructions/codes. Examples of the computing device may include, but are not limited to, a desktop computer, a laptop, a personal digital assistant (PDA), a mobile device, a Smartphone, a tablet computer (e.g., iPad® and Samsung Galaxy Tab®), and/or the like.

An "organization" refers to an organized collection of individuals employed to perform one or more tasks directed towards a particular objective, such as to perform tasks related to operations, administration, and business dealings associated with the organization. The collection of individuals employed by the organization and/or one or more external vendors of the organization may work for the organization to provide one or more services to one or more clients of the organization. The one or more services may be provided to the one or more clients by execution of one or more processes in the organization.

A "client" refers to an organization, an individual, a group of individuals, or a third party entity, which may request for one or more services from an organization. The one or more services may be provided to the client by execution of one or more processes in the organization. In an embodiment, the client may be external to the organization. Alternatively, the client may correspond to an entity internal to the organization. That is, the client may be a part of a first department or group of the organization, whereas, the one or more employees who service the request of the client may be a part of the first or a second department or group of the organization. For instance, the client may correspond to a management of the department or group and the one or more employees may correspond to the personnel associated with that department or group.

A "resource" refers to an employee, a vendor, a computing-device, a building, machinery, and/or other capital investment of an organization which may be an integral entity to provide services to a client.

A "process" refers to a workflow including one or more ordered tasks that may be performed by one or more resources associated with an organization to provide a service to at least one client of the organization. In an embodiment, one or more processes of the organization may correspond to a transaction-based outsourcing process of the organization to provide one or more transactional services to one or more clients of the organization. In an embodiment, the organization may implement a service delivery framework to service the one or more clients of the organization. That is, the one or more processes may be executed through the service delivery framework to service the one or more clients of the organization.

"Process compliance" refers to a degree of adherence of an observed execution of a process with respect to an expected execution of the process. A deviation of the process compliance of a process may be observed when the observed execution of the process deviates from its expected execution in terms of one or more performance metrics (in terms of SLAs/KPIs), control-flow related aspects, data-related aspects, and/or resources-related aspects.

An "activity" or "task" refers to an individual step that may be required to be performed to carry out a workflow associated with a process, during an execution of the process. The activity or task may have well defined input and output parameters. A resource of the organization employed on the activity or task may be required to apply his/her skill set and experience to efficiently convert the input to the output associated with the activity or task to meet SLAs or KPIs defined for the activity or task.

An "event" refers to an occurrence of an instance of a process, such as when an activity or task related to an execution of the process is performed by a resource associated with an organization. The event may be captured along with metadata associated with the event, such as occurrence timestamp, resources involved, incurred cost, and the like. Data associated with the captured event may be stored as event data in an event log in a database.

A "Service Level Agreement" (SLA) refers to a service delivery contract that may be officially agreed upon and signed between a service provider (such as an organization) and a service recipient (such as a client of the organization). Typically, the SLA may include various aspects of service, such as scope, quality, and responsibilities of both parties of the contract. Any lapses related to execution of work related to the SLA may require the party responsible for the lapses to bear any losses incurred thereof, as per terms and conditions specified in the SLA.

A "Key Performance Indicator" (KPI) refers to a measurable business metric that may be used by an organization to evaluate factors that may be considered as essential for success of the organization. The KPIs may differ for various organizations, based on the type of the organization and the domain of operation of the organization. Examples of KPIs may include, but are not limited to, turn-around-time (TAT), average processing time of process, and the like.

A "service delivery framework" refers to a pre-determined business plan or a blueprint associated with a service-sector organization that may be implemented by the organization to service a plurality of clients of varied types. The plurality of clients of different types may be provided one or more services by the organization by execution of one or more processes in the organization through the service delivery framework implemented by the organization. In addition, in an embodiment, the service delivery framework may define how the plurality of clients of the organization may be segregated into various predefined types. The service delivery framework may also be used to translate client specific SLAs and KPIs (external or committed to the client) into organizational SLAs and KPIs (internal or committed within the organization), and vice versa. The service delivery framework may also indicate the various service offerings of the organization and an operational structure of the organization for servicing clients of different types.

A "process model" refers to structural or descriptive representation associated with a workflow or a pattern of ordered activities or tasks associated with a process. In an embodiment, a process model of a process may be pre-determined for an organization and a predefined type of a plurality of clients of the organization. The process model may also be determined based on process mining (or process discovery analysis) of the event log across the plurality of clients of the predefined type.

A "decision rule" refers to a rule that may define or constraint one or more aspects of business or decision-making associated with an organization. The decision rule may assert a business structure to control or influence a process execution behavior of one or more processes in the organization.

An "organizational structure" refers to a system that may define a hierarchy of employees, associates, or consultants associated with an organization. The organization structure may identify various jobs in the organization. Further, the organizational structure may indicate authority, communication, rights, duties, and chain of reporting framework associated with each job in the organization.

"Skill metrics" refer to one or more matrices that may be used to represent experience and skill proficiency of various resources associated with the organization.

FIG. 1 is a block diagram of a system environment 100 in which various embodiments may be implemented. The system environment 100 includes one or more organizational computing-devices 102, one or more clientele computing-devices 104, a first user computing-device 106, a database server 108, an application server 110, and a communication network 112. The one or more organizational computing-devices 102 may include a first set of computing-devices 102A-1 to 102A-N, a second set of computing-devices 102B-1 to 102B-N, and a third set of computing-devices 102C-1 to 102C-N. The one or more clientele computing-devices 104 may include one or more first client computing-devices 104A, one or more second client computing-devices 104B, and one or more third client computing-devices 104C. The one or more first client computing-devices 104A may include a first computing-device 104A-1, a second computing-device 104A-2, and a third computing-device 104A-3, associated with a first client. Similarly, the one or more second client computing-devices 104B may include a first computing-device 104B-1, a second computing-device 104B-2, and a third computing-device 104B-3, associated with a second client. Further, the one or more third client computing-devices 104C may include a first computing-device 104C-1, a second computing-device 104C-2, and a third computing-device 104C-3, associated with a third client. The various devices of the system environment 100 may be communicatively coupled through the communication network 112.

The one or more organizational computing-devices 102 may correspond to computing devices that may be used in an organization by one or more employees or vendors of the organization. The one or more organizational computing-devices 102 may be used to perform one or more tasks associated with operations, management, or administration of the organization. Further, the one or more organizational computing devices 102 may be used to perform one or more tasks associated with one or more processes executed in the organization to service a plurality of clients of the organization. In an embodiment, the organization may implement a service delivery framework to service the plurality of clients of the organization. That is, the one or more processes may be executed through the service delivery framework to service the plurality of clients of the organization. In accordance with an embodiment, the one or more organizational computing-devices 102 may capture one or more distinct events during the execution of the one or more processes. Thereafter, the one or more organizational computing-devices 102 may transmit the captured event and associated information, i.e. metadata, to the database server 108 for storage in an event log. The event data stored in the event log may be later analyzed by the application server 110 for generation of recommendations for the client process execution of the one or more processes in the organization.

In FIG. 1, the one or more organization computing-devices 102 are shown to include computing devices of various types. For instance, the first set of computing-devices 102A-1 to 102A-N from amongst the one or more computing-devices 102 may correspond to computing-devices that may be provided at workstations associated with the one or more employees of the organization. Examples of the first set of computing devices 102A-1 to 102A-N may include desktop personal computers or thin-client (or Virtual Machine) based computers. Further, the second set of computing-devices 102B-1 to 102B-N may include portable computing devices that may be used by the one or more employees or vendors during traveling, official tours, work-from-home, or otherwise. In addition, the third set of computing devices 102C-1 to 102C-N may correspond to portable computing devices used under a BYOD (Bring Your Own Device) IT infrastructure associated with the organization. That is, the third set of computing devices 102C-1 to 102C-N may be owned by the individual employees or vendors of the organization. However, one or more hardware and/or software may be installed or configured in such computing devices to enable such computing devices to function according to the IT policies of the organization, to protect against data theft and data leakage. Examples of the portable computing devices may include, but are not limited to, a laptop, a tablet computer, a Smartphone, and/or a personal digital assistant.

The one or more clientele computing-devices 104 may correspond to computing devices that may be associated with one or more clients of the organization. The one or more first client computing-devices 104A may be associated with the first client, whereas the one or more second client computing-devices 104B may be associated with the second client. Further, the one or more third client computing-devices 104C may be associated with the third client. The one or more clients of the organization may request one or more services that may be provided by the organization. The one or more services may be provided to the one or more clients based on execution of one or more processes in the organization. The one or more clients may receive an output of the one or more services from the one or more organizational computing-devices 102, on the one or more clientele computing-devices 104. The output of the one or more services may include, but is not limited to, one or more reports, media content, compilation of data and statistics and/or other information provided by the organization to the one or more clients on request.

In an embodiment, the client may be external to the organization. Alternatively, the client may correspond to an entity internal to the organization. That is, the client may be a part of a first department or group of the organization, whereas, the one or more employees who service the request of the client may be a part of a second department or group of the organization. In another scenario, the one or more employees may be employees of the same first department or group of the organization. For instance, the client may correspond to a management of the department or group and the one or more employees may correspond to the personnel associated with that department or group. When the client corresponds to an internal entity of the organization, one or more computing-devices of the client may belong to the one or more organizational computing-devices 102.

The one or more clientele computing devices 104 may be of various types. For instance, the first computing-device 104A-1 associated with the first client may correspond to desktop personal computers or thin-client (or Virtual Machine) based computers. The second computing-device 104A-2 associated with the first client may correspond to portable computing devices used by users associated with the first client while traveling, official tours, work-from-home, or otherwise. Further, the third computing-device 104A-3 associated with the first client may correspond to portable computing devices used under a BYOD IT infrastructure of the first client. Examples of the portable computing devices may include, but are not limited to, a laptop, a tablet computer, a Smartphone, and/or a personal digital assistant. The one or more second client computing-devices 104B and the one or more third client computing-devices 104C may be similar to the one or more first client computing-devices 104A.

The first user computing-device 106 may correspond to a computing device used by a user who may desire to receive recommendations for optimization of the one or more processes of the organization. The user may correspond to an employee of the organization, such as an analyst, a manager of a department, a business unit head, and/or a director of a company. Alternatively, the user may correspond to a third party associate, such as a legal or corporate counsel, an external auditor, and/or a client of the organization. The user may use the first user computing-device 106 to transmit a request to the application server 110 to analyze the one or more processes of the organization across a plurality of clients of the organization. The plurality of clients may belong to predefined types. Based on the analysis, the first user computing-device 106 may receive one or more recommendations for optimization of the one or more processes of the organizations, which may be displayed to the user, via a user interface of the first computing-device 106.

In an embodiment, the first user computing device 106 may either be one of the one or more organizational computing-devices 102 or may be one of the one or more clientele computing-devices 104. Alternatively, the first user computing-device 106 may be separate from the one or more organizational computing-devices 102 and the one or more clientele computing-devices 104, as shown in FIG. 1. Examples of the first computing-device 106 may include, but are not limited to, a personal computer, a laptop computer, a tablet computer, a Smartphone, and/or a personal digital assistant.

In an embodiment, the database server 108 may be configured to store the event log associated with the one or more processes executed in the organization. The event log may store data associated with the one or more events that may be captured during the execution of the one or more processes in the organization. In accordance with an embodiment, the one or more processes may correspond to services provided by the organization to the plurality of clients of the predefined type. Thus, the event log may be associated with services provided to the plurality of clients of the predefined type. Further, the database server 108 may store one or more other event logs that may store event data related to one or more other processes used to service another plurality of clients of another predefined type. Alternatively, the database server 108 may store a single event log that may include event data related to processes used to service all the clients of the organization. In such a scenario, during the analysis of the event log, the event log may be filtered to retrieve event data associated with the plurality of client of a specific predefined type.

In addition to storing the event log, the database server 108 may store augmented business data associated with the organization. The augmented business data may include one or more process models of the one or more processes, or decision rules, organizational structure, and/or skill metrics associated with the organization. Further, the database server 108 may also store information associated with the service delivery framework deployed by the organization to provide services to the one or more clients based on execution of the one or more processes.

In an embodiment, the database server 104 may receive a query from the one or more organizational computing-devices 102, the first user computing-device 106, and/or the application server 110, to extract/store information from/to the database server 108. The database server 108 may be realized through various database technologies such as, but not limited to, Microsoft® SQL Server, Oracle®, IBM DB2®, Microsoft Access®, PostgreSQL®, MySQL®, and SQLite®. In an embodiment, the one or more organizational computing-devices 102, the first user computing-device 106, and/or the application server 110 may connect to the database server 108 using one or more protocols such as, but not limited to, Open Database Connectivity (ODBC) protocol and Java Database Connectivity (JDBC) protocol.

A person with ordinary skills in the art will understand that the scope of the disclosure is not limited to the database server 108 as a separate entity. In an embodiment, the functionalities of the database server 108 can be integrated into the application server 110 and/or the first user computing-device 106.

In an embodiment, the application server 110 refers to a computing device or a software framework hosting an application or a software service. In an embodiment, the application server 110 may be implemented to execute procedures such as, but not limited to, programs, routines, or scripts stored in one or more memories for supporting the hosted application or the software service. In an embodiment, the hosted application or the software service may be configured to perform one or more predetermined operations.

In an embodiment, the application server 110 may be configured to receive a request from the first user computing-device 106 for recommendations to improve execution of one or more processes associated with provision of services by the organization to a plurality of clients of a predefined type. Based on the received request, the application server 110 may extract event data associated with one or more events that may be captured during execution of the one or more processes in the organization. As discussed, the one or more processes may be used to service the plurality of clients of the predefined type. The application server 110 may analyze the retrieved event data across the plurality of clients of the predefined type to determine cross-clientele information associated with the one or more processes. The cross-clientele information may include includes a process compliance deviation between an observed and an expected client process execution of the one or more processes. For instance, the cross-clientele information may include compliance deviations of the processes, in terms of one or more performance metrics (such as KPIs/SLAs), control-flow related aspects, data-related aspects, and/or resources-related aspects. The application server 110 may determine a set of root-causes associated with the process compliance deviation based at least on one or more process models of the one or more processes and/or one or more decision rules associated with the organization. Thereafter, the application server 110 may generate one or more recommendations for an optimized execution of the one or more processes in the organization based on the determined set of root-causes. The application server 110 may transmit the one or more generated recommendations to the first user computing device 106, for display to the user of the first user computing device 106. The analysis of the event log for the generation of the one or more recommendations for improvement of execution of the one or more processes is explained further in conjunction with FIG. 3A and FIG. 3B.

The application server 110 may be realized through various types of application servers such as, but not limited to, a Java application server, a .NET framework application server, a Base4 application server, a PHP framework application server, or any other application server framework.

A person with ordinary skills in the art will understand that the scope of the disclosure is not limited to the application server 110 as a separate entity. In an embodiment, the application server 110 may be implemented as an application program installed on the first user computing-device 106. In such a scenario, the first user computing-device 106 may include the functionalities of the application server 110.

The communication network 112 corresponds to a medium through which content and messages flow between various devices of the system environment 100 (e.g., the one or more organizational computing-device 102, the one or more clientele computing-devices 104, the first user computing-device 106, the database server 108, and/or the application server 110). Examples of the communication network 112 may include, but are not limited to, a Wireless Fidelity (Wi-Fi) network, a Wireless Area Network (WAN), a Local Area Network (LAN), or a Metropolitan Area Network (MAN). Various devices in the system environment 100 can connect to the communication network 112 in accordance with various wired and wireless communication protocols such as Transmission Control Protocol and Internet Protocol (TCP/IP), User Datagram Protocol (UDP), and 2G, 3G, or 4G communication protocols.

Figure 2:
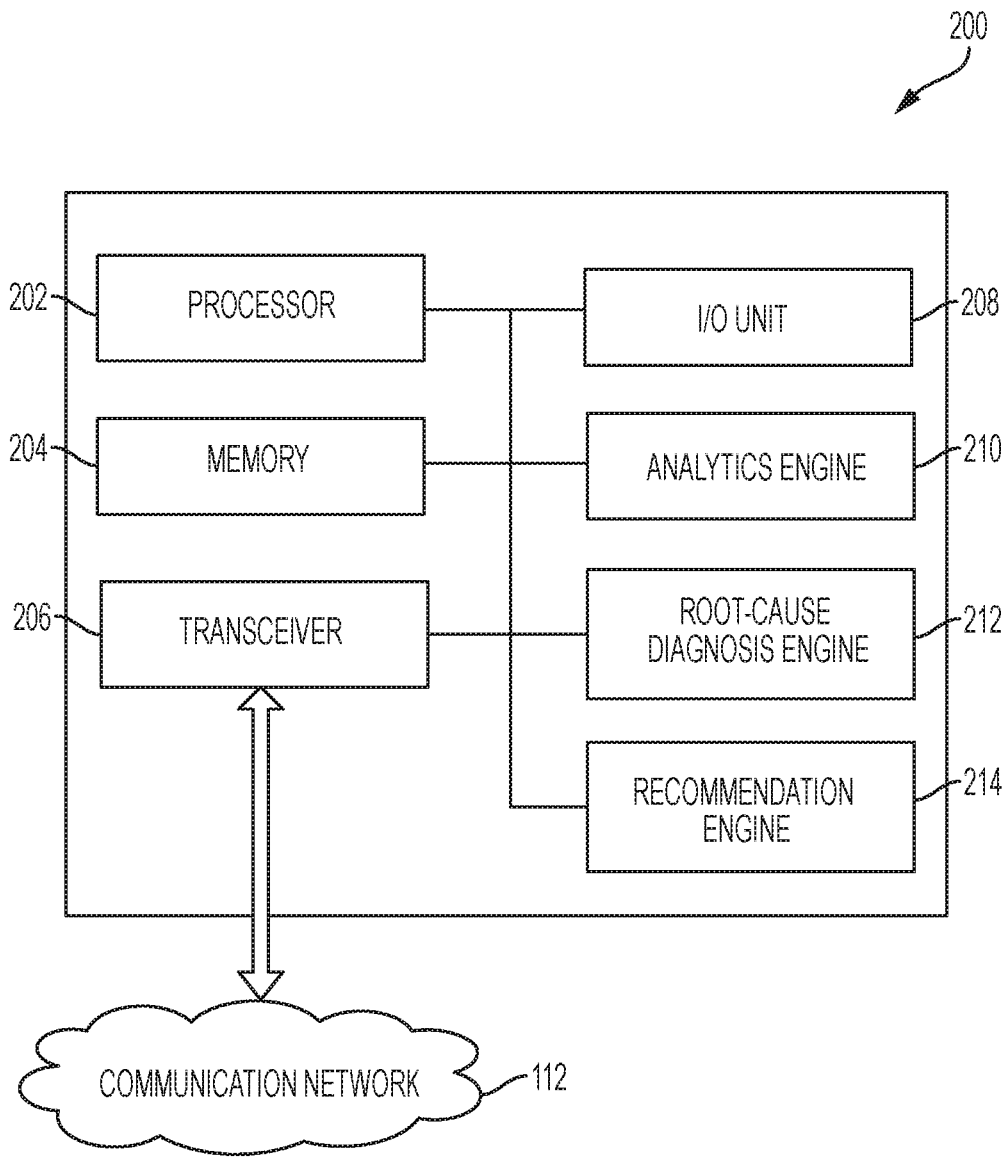
FIG. 2 is a block diagram that illustrates a system for generating recommendations associated with client process execution in an organization, in accordance with at least one embodiment.

FIG. 2 is a block diagram that illustrates a system for generating recommendations associated with client process execution in an organization, in accordance with at least one embodiment. With reference to FIG. 2, there is shown a system 200 that may correspond to the application server 110 or the first user computing-device 106. For the purpose of ongoing description, the system 200 is considered as the application server 110. However, the scope of the disclosure should not be limited to the system 200 as the application server 110. The system 200 may also be realized as the first user computing-device 106, without departure from the scope of the disclosure.

The system 200 includes one or more processors, such as a processor 202, one or more memories, such as a memory 204, one or more transceivers, such as a transceiver 206, and one or more input/output (I/O) units, such as an I/O unit 208. The system 200 may further include an analytics engine 210, a root-cause diagnosis engine 212, and a recommendation engine 214. The transceiver 206 may be connected to the communication network 112.

The processor 202 may be configured to execute one or more sets of instructions, codes, scripts, and programs stored in the memory 204. The processor 202 is coupled to the memory 204, the transceiver 206, the I/O unit 208, the analytics engine 210, the root-cause diagnosis engine 212, and the recommendation engine 214. The processor 202 may execute the one or more sets of instructions, codes, scripts, and programs stored in the memory 204 to perform the one or more associated operations. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, and/or a Complex Instruction Set Computing (CISC) processor.

The memory 204 may be operable to store one or more machine codes, and/or computer programs having at least one code section executable by the processor 202. The memory 204 may store the one or more sets of instructions, codes, scripts, and programs. Some of the commonly known memory implementations include, but are not limited to, a random access memory (RAM), a read only memory (ROM), a hard disk drive (HDD), and a secure digital (SD) card. In an embodiment, the memory 204 may include the one or more machine codes, and/or computer programs that may be executable by the processor 202 to perform specific operations. It will be apparent to a person having ordinary skill in the art that the one or more sets of instructions, codes, scripts, and programs stored in the memory 204 may enable the hardware of the system 200 to perform the one or more associated operations.

The transceiver 206 may be operable to communicate with the one or more devices, such as the one or more organizational computing-devices 102, the one or more clientele computing-devices 104, and the first user computing-device 106, and/or one or more servers, such as the database server 108, via the communication network 112. The transceiver 206 may be configured to receive a request from a user of the first user computing-device 106, via the communication network 112. Based on the request, under the command of the processor 202, the transceiver 206 may be configured to receive event data retrieved from the event log stored in the database server 108. The received event data may then be stored in the memory 204 for further analysis. The transceiver 206 may further transmit the one or more recommendations generated based on the analysis of the event data to the first user computing-device 106, via the communication network 112.

Examples of the transceiver 206 may include, but are not limited to, an antenna, an Ethernet port, a USB port, or any other port that can be configured to receive and transmit data. The transceiver 206 may receive and transmit data/ information in accordance with the various communication protocols, such as, TCP/IP, UDP, and 2G, 3G, or 4G communication protocols through an input terminal and an output terminal, respectively over the communication network 112.

The I/O unit 208 may comprise suitable logic, circuitry, interfaces, and/or code that may be operable to receive one or more inputs from one or more users of the system 200. The I/O unit 208 may be operable to communicate with the processor 202. Examples of the input devices may include, but are not limited to, a touch screen, a keyboard, a mouse, a joystick, a microphone, a camera, a motion sensor, a light sensor, and/or a docking station.

The analytics engine 210 may comprise suitable logic, circuitry, interfaces, and/or code that may be operable to execute one or more sets of instructions, codes, scripts, and programs stored in the memory 204. The analytics engine 210 may be realized by use of one or more mathematical models, one or more statistical models and/or one or more algorithms. The analytics engine 210 may be configured to perform the cross-clientele analysis of the event data extracted from the event log (stored in the database server 108) to determine cross-clientele information. The cross-clientele information may be include statistical trends in the event data related to the execution of the one or more processes of the organization across the plurality of clients of the predefined type. In an embodiment, the analysis of the event data may further include one or more of: a process discovery analysis, a process complexity analysis, a compliance analysis, and a performance analysis.

The analytics engine 210 may be implemented based on a number of processor technologies known in the art. Examples of the analytics engine 210 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The root-cause diagnosis engine 212 may comprise suitable logic, circuitry, interfaces, and/or code that may be operable to execute one or more sets of instructions, codes, scripts, and programs stored in the memory 204. The root-cause diagnosis engine 212 may be realized by use of one or more mathematical models, one or more statistical models and/or one or more algorithms. The root-cause diagnosis engine 212 may be configured to determine the set of root-causes for the process compliance deviation between the observed and the expected client process execution of the one or more processes. The set of root-causes may be determined based on the one or more process models of the one or more processes and/or one or more decision rules associated with the organization.

The root-cause diagnosis engine 212 may be implemented based on a number of processor technologies known in the art. Examples of the root-cause diagnosis engine 212 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

The recommendation engine 214 may comprise suitable logic, circuitry, interfaces, and/or code that may be operable to execute one or more sets of instructions, codes, scripts, and programs stored in the memory 204. The recommendation engine 214 may be realized by use of one or more mathematical models, one or more statistical models and/or one or more algorithms. The recommendation engine 214 may be configured to generate the one or more recommendations for optimization of the one or more processes based on the determined set of root-causes.

The recommendation engine 214 may be implemented based on a number of processor technologies known in the art. Examples of the recommendation engine 214 may include, but are not limited to, an X86-based processor, a Reduced Instruction Set Computing (RISC) processor, an Application-Specific Integrated Circuit (ASIC) processor, and/or a Complex Instruction Set Computing (CISC) processor.

In FIG. 2, the analytics engine 210, the root-cause diagnosis engine 212, and/or the recommendation engine 214 are depicted as independent from the processor 202. However, a person skilled in the art will appreciate that the analytics engine 210, the root-cause diagnosis engine 212, and/or the recommendation engine 214 may be implemented within the processor 202 without departure from the scope of the disclosure. Further, a person skilled in the art will appreciate that the processor 202 may be configured to perform the functionalities of the analytics engine 210, the root-cause diagnosis engine 212, and/or the recommendation engine 214, without departure from the scope of the disclosure.

Figure 3A:
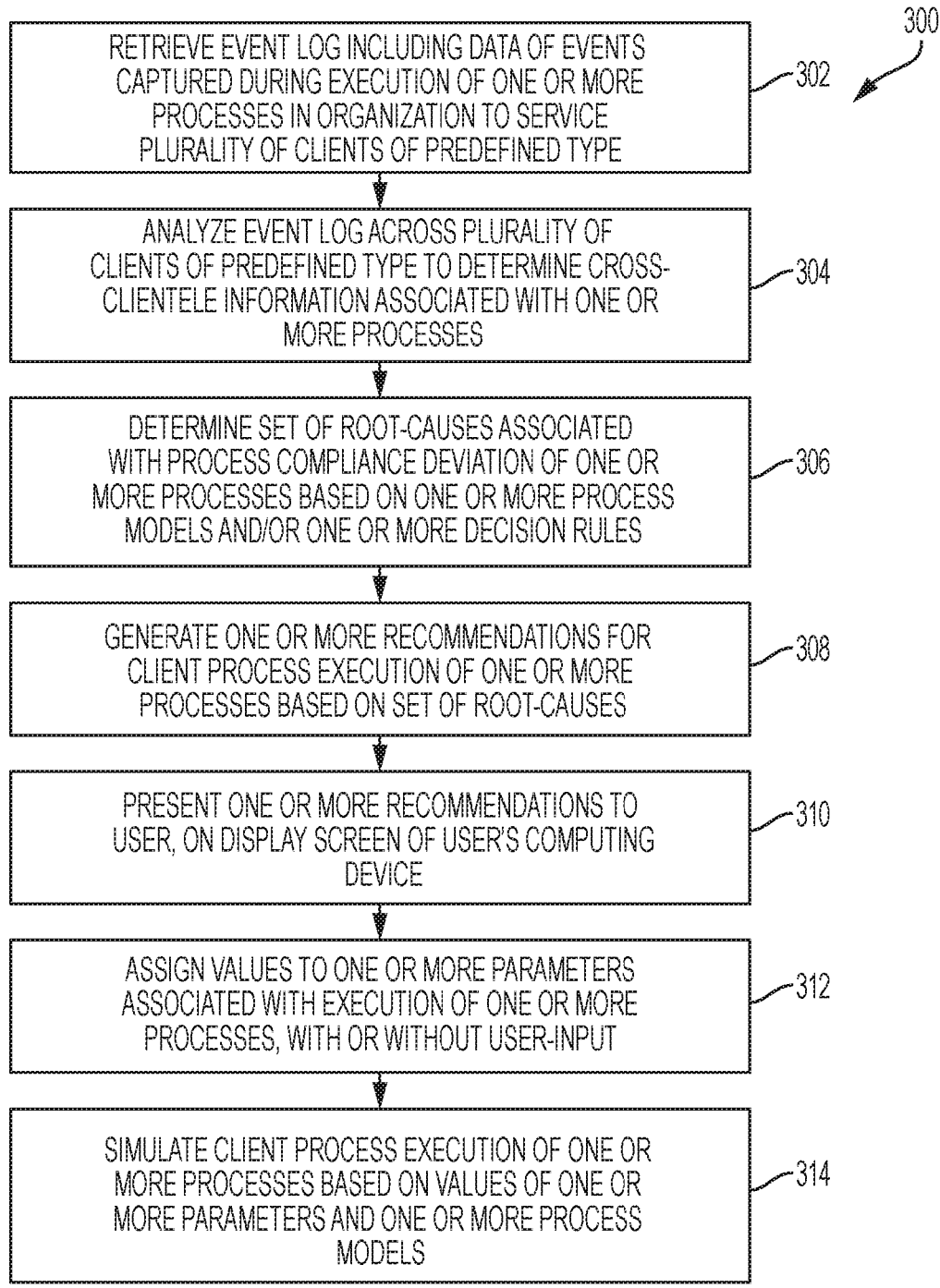
FIG. 3A is a flowchart that illustrates a method for generating recommendations associated with client process execution in an organization, in accordance with at least one embodiment.
Figure 3B:
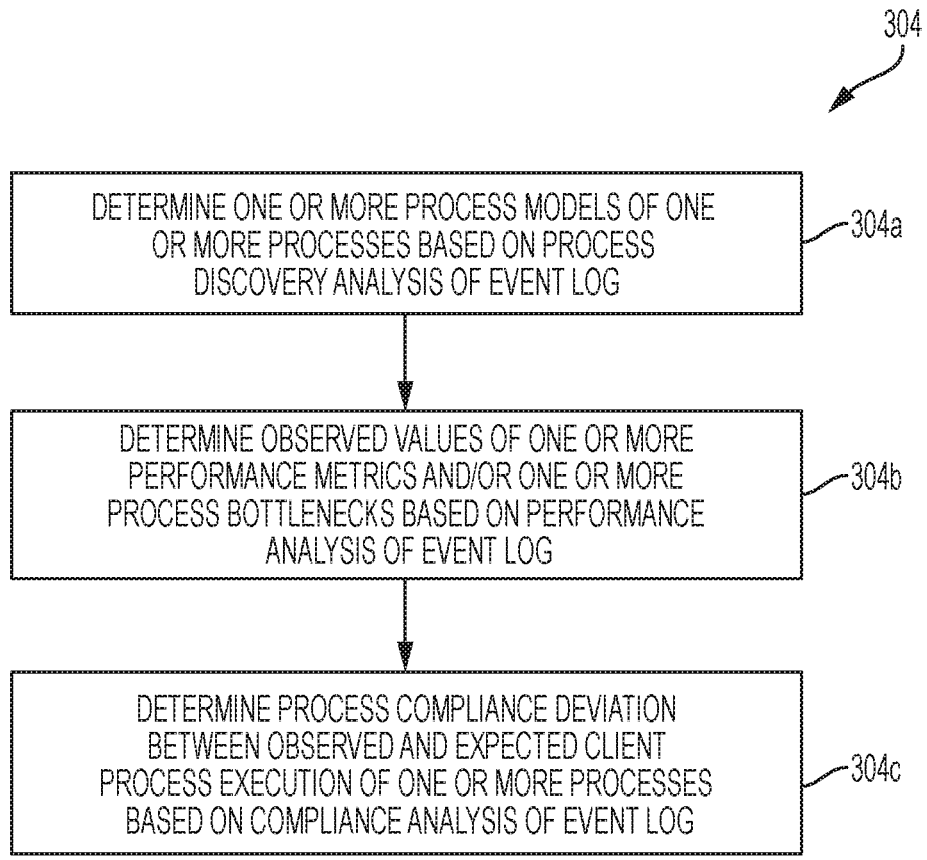
FIG. 3B is a flowchart that illustrates a method for performing a cross-clientele analysis of an event log across a plurality of clients of an organization, in accordance with at least one embodiment.

An operation of the system 200 for generation of recommendations associated with client process execution in an organization has been explained further in conjunction with FIGS. 3A and 3B.

FIG. 3A is a flowchart that illustrates a method for generating recommendations associated with client process execution in an organization, in accordance with at least one embodiment. With reference to FIG. 3A, there is shown a flowchart 300 that has been described in conjunction with FIG. 1 and FIG. 2. The flowchart 300 illustrates the method that starts at step 302.

At step 302, an event log may be retrieved from the database server 108. In an embodiment, the processor 202 may be configured to retrieve the event log from the database server 108. Prior to retrieval of the event log from the database server 108, the database server 108 may be configured to receive event data associated with one or more events. The one or more events may occur when one or more processes are executed to provide one or more services by an organization to a plurality of clients of a predefined type. The predefined type may correspond to, but not limited to, a geographical region of operation of a client, one or more domains in which the client operates, a type of work that the client allocates to the organization, and/or a type of operational or functional relationship of the client and the organization.

In an embodiment, one or more resources (such as, the one or more employees or vendors of the organization) may use the one or more organizational computing-devices 102 to perform one or more tasks to provide the one or more services to the plurality of clients. The one or more tasks may be associated with an execution of the one or more processes in the organization. In an embodiment, the one or more organizational computing-devices 102 may include an application program installed therein that may monitor the performance of the one or more tasks on the respective organizational computing-devices 102. The application program installed on each of the one or more organization computing-devices 102 may capture the one or more events based on the monitoring of the performance of each of such one or more task. The application program may also record metadata associated with the captured events. The one or more organizational computing-devices 102 may transmit information associated with the captured one or more events as the event data to the database server 108 for storage in the event log.

In an embodiment, the event data may be stored in various formats in the event log, depending on the type of processes, clients, and/or business requirements of the organization. Examples of the various formats in which the event data may be stored may include, but not limited to, a database record, a plain text file, or any other file type. In an embodiment, a common or consistent file type of the event data may be required for analysis of the one or more executed processes. In an embodiment, the database server 108 may convert the event data received from various sources into a common event log format based on a meta-model. Alternatively, if the event data is not in the common event log format, the processor 202 may convert the retrieved event data into the common event log format, before further analysis of the one or more executed processes in the event data. Examples of the common event log format may include, but not limited to, a Mining eXtensible Markup Language (Mining XML or MXML) format or eXtensible Event Stream (XES) format.

As discussed, the event data may include information pertaining to the one or more events captured during the execution of the one or more processes in the organization. The one or more processes may correspond to a workflow including one or more ordered tasks performed by the one or more resources associated with the organization to provide a service to at least one client. In an embodiment, the one or more processes may correspond to a transaction-based outsourcing business of the organization to provide one or more transactional services to one or more clients of the organization. In an embodiment, the organization may implement a service delivery framework to service the one or more clients of the organization. That is, the one or more processes may be executed through the service delivery framework to service the one or more clients of the organization. In an embodiment, the service delivery framework may define how the one or more clients of the organization may be segregated into various predefined types. The service delivery framework may also be used to translate client specific SLAs and KPIs (external or committed to the client) into organizational SLAs and KPIs (internal or committed within the organization), and vice versa. The service delivery framework may also indicate the various service offerings of the organization and an operational structure of the organization for servicing clients of different types.

In an embodiment, the retrieved event data may include information related to the execution of processes used to service clients of a particular type. For instance, clients operating in a particular domain of business, or clients based out of a geographic region may belong to a particular type. In an embodiment, the user of the first user computing-device 106 may provide an input associated with the categorization of the clients into a predefined type based on the various criteria, as specified above. Further, the user of the first user computing-device 106 may request for recommendations for optimization of processes related to servicing the clients categorized in the type specified by the user. In case the event log includes data of execution of processes related to clients of various types, the processor 202 may request the database server 108 to filter the event log based on the clients belonging to the type specified by the user. Based on the filtering of the event log, the processor 202 may retrieve event data related to execution of processes specific to the clients that belong to the type specified by the user, from the database server 108.

In an exemplary embodiment, each process "p" may be captured in the event log "L" as a set of process instances "pi" also referred to as a "case." Each event "e" in the event log "L" may correspond to a single case related to an activity or a task. For instance, an event "$e_1$" may correspond to a transcription task, while a next event "$e_2$" may correspond to an audit task. Further, events belonging to a process "p" or a "case" may be ordered, based on a sequence in which the activities or the tasks of the process may be performed. In addition, event data associated with each event "e" may include metadata or attributes related to the event. Examples of the metadata or attributes related to the event may include, but are not limited to, a transaction type of the task related to the event, a timestamp related to the execution of the event, one or more resources involved in the event, a cost associated with the event, and/or a revenue associated with the event. For instance, an event "$e_1$" may be related to a transcription task. The metadata of the event "$e_1$" may indicate that the transaction type of the event "$e_1$" may be a "start" type of task. The metadata related to the event "$e_1$" may further indicate that the event "$e_1$" may be performed at a date/time, such as "Mar. 15, 2016" at "12:30:10 hours IST," by a resource, "Peter." Further, the metadata related to the event "$e_1$" may indicate that the event "$e_1$" costs "2.5 USD per minute" and produces revenue of "3.25 USD per minute." The metadata or attributes of each event associated with a process may be useful for analysis of the execution of the process to determine one or more performance metrics associated with the execution of the process. Further, as data related to the resources performing the tasks is captured in the metadata or attributes of the event, such information may be useful in determination of productivity and utilization of the resources. An exemplary event log is explained further in conjunction with FIG. 5.

At step 304, the event log may be analyzed across the plurality of clients of the predefined type. In an embodiment, the analytics engine 210, under the control of the processor 202, may be configured to analyze the event data associated with the plurality of clients of the predefined type from the retrieved event log. Based on the cross-clientele analysis of the event data across the plurality of clients of the predefined type, the analytics engine 210 may determine cross-clientele information. The cross-clientele information may correspond to statistics associated with execution of the one or more processes associated with providing services to the plurality of clients of the predefined type. In an embodiment, the cross-clientele information may include includes a process compliance deviation between an observed and an expected client process execution of the one or more processes. For instance, the cross-clientele information may include compliance deviations of the processes, in terms of one or more performance metrics (such as KPIs/SLAs), control-flow related aspects, data-related aspects, and/or resources-related aspects. The cross-clientele information may further include, but may not be limited to, one or more process models, a process complexity, one or more bottlenecks, and/or observed values of the one or more performance metrics, associated with execution of the one or more processes. In an embodiment, the analytics engine 210 may analyze the event data holistically across four dimensions of process execution, namely control-flow, data, resource, and time. In an embodiment, the analytics engine 210 may be implemented using a ProM (Process Mining) framework to perform process mining analysis of the event log across the plurality of clients of the predefined type. The ProM framework may correspond to an extensible software framework that may include one or more modules that may support a variety of process mining techniques as plug-ins. Thus, the analytics engine 210 may be built upon the ProM framework to re-use the process mining techniques supported therein. The analytics engine 210 may perform the cross-clientele analysis of the event data by performing one or more of: a process discovery analysis, a process complexity analysis, a compliance analysis, and/or a performance analysis of the event log. The performance of the cross-clientele analysis of the event log across the plurality of clients of the organization is explained in further detail in FIG. 3B.

FIG. 3B is a flowchart that illustrates a method for performing the cross-clientele analysis of the event log across the plurality of clients of the organization, in accordance with at least one embodiment. With reference to FIG. 3B, there is shown a flowchart 304, which is an elaboration of step 304 of the flowchart 300 of FIG. 3A. The flowchart 304 of FIG. 3B has been described in conjunction with FIG. 1, FIG. 2, and FIG. 3A. The flowchart 304 illustrates the method that starts at step 304a.

At step 304a, the one or more process models of the one or more processes are determined. In an embodiment, the analytics engine 210, under the control of the processor 202, may be configured to determine the one or more process models of the one or more processes. The analytics engine 210 may determine the one or more process models by performing a process discovery analysis of the event log across the plurality of clients of the predefined type. Examples of the process discovery analysis techniques may include, but are not limited to, Petri-nets, Event-driven Process Chain (EPC), Business Process Model and Notation (BPMN), heuristic-net, and/or other process mining techniques known in the art. In an embodiment, the process model of a process may describe various aspects related to the process such as, but not limited to, a control-flow aspect, an organizational aspect, and/or a time aspect of the process. For instance, the discovered process models may provide insights or statistics related to a frequency of execution of a particular type of activity and a control-flow associated with a process across the plurality of clients of the predefined type. Other statistics that may be uncovered through the process discovery analysis may include an average number of transactions/activities of each type being executed per resource for each process across the plurality of clients. Further, cross-clientele statistics related to number of resources of various types used for various processes may also be determined. An exemplary process model for transaction-based business processes of an organization is explained further in conjunction with FIG. 6.

The analytics engine 210 may discover one or more workflow patterns used in the one or more processes, based on the process discovery analysis across the plurality of clients. Further, the analytics engine 210 may compare the one or more workflow patterns across the plurality of clients. Based on the comparison of the one or more workflow patterns, the analytics engine 210 may determine one or more variations of the one or more workflow patterns across the plurality of clients. Further, the analytics engine 210 may determine how the one or more workflow patterns are similar across the plurality of clients. In an embodiment, based on such comparison of the one or more workflow patterns, the analytics engine 210 may determine the one or more process models of the one or more processes. In addition to process discovery analysis, the analytics engine 210 may perform a complexity analysis of the event log to determine a process complexity associated with each of the one or more processes. The process complexity of each process may indicate a level of complexity and external dependency associated with that process. Complexity of each process may be defined in terms of number of activity nodes and connected arcs in a graphical representation (such as a Petri-net graph) of the process model of the process.

Complexity of each process may also be captured in terms of other metrics, such as "structured-ness" or "entropy," of the process model of the process. Exemplary process models of a process across two different clients, which may be determined based on the cross-clientele analysis of the event log, are explained further in conjunction with FIGS. 7A and 7B.

At step 304b, the observed values of the one or more performance metrics of the one or more processes may be determined. Further, the one or more process bottlenecks of the one or more processes may also be determined. In an embodiment, the analytics engine 210, under the control of the processor 202, may determine the observed values of the one or more performance metrics and the one or more process bottlenecks of the one or more processes, based on performance analysis of the event log. The observed values of the one or more performance metrics and the one or more bottlenecks may be determined based on cross-clientele analysis of the metadata of the one or more events in the retrieved event data. The one or more performance metrics may be measured in terms of a set of Key Performance Indicators (KPIs) and/or a set of Service Level Agreements (SLAs). The set of KPIs or SLAs may be defined based on the one or more process models, decision rules of the organization, client requirements, and/or the predefined type associated with the plurality of clients.

For instance, timestamp values associated with activities of various types may be used to determine metrics, such as average processing or working time, associated with that activity type. Further, analysis of the timestamp values may also be used to determine values of metrics, such as waiting time of activities, sojourn time between activities, and turnaround time (TAT) of activities. On cross-clientele analysis of the metadata related to the resources across the plurality of clients, the analytics engine 210 may determine various resource performance metrics. For instance, average processing time taken by a resource to process activities of various types, efficiency and productivity metrics associated with performance of an activity, and the like, may be determined. The one or more bottlenecks may be determined in terms of metrics, such as average waiting time of activities of various types, types of activities that are in wait state for a maximum time (or greater than a threshold time). Other metrics that may be used to determine the one or more bottlenecks may include resource allocation per activity, average slack time of activities of various types, resources that consume maximum time during processing of activities of a particular type, and the like.

At step 304c, a process compliance deviation between an observed and an expected client process execution of the one or more processes may be determined. In an embodiment, the analytics engine 210, under the control of the processor 202, may determine the process compliance deviation by performing compliance analysis of the event log. In an embodiment, the analytics engine 210 may determine the expected values of the one or more performance metrics and/or expected client process execution behavior of the one or more processes based on the one or more process models and/or decision rules associated with the organization. The analytics engine 210 may determine the observed behavior of the client process execution of the one or more processes in terms of the observed values of the one or more performance metrics and other dimensions of process execution such as control-flow, data, resources, and time. In an embodiment, the analytics engine 210 may determine the process compliance deviation in quantitative and qualitative terms. To determine the quantitative deviation, the analytics engine 210 may compare the observed values of the one or more performance metrics (as determined in step 304b) with the expected values of the one or more performance metrics. As the one or more performance metrics may correspond to quantitative performance metrics, the deviation in terms of these performance metrics may be a measure by which the observed execution differs from the expected execution of the one or more processes in quantitative terms. In addition, the analytics engine 210 may also perform compliance analysis of the event log across the plurality of clients qualitatively, to determine one or more qualitative performance metrics. That is, the analytics engine 210 may determine a qualitative deviation associated with the execution of the one or more processes. The qualitative deviation may indicate as to how compliant is the observed execution behavior of the one or more processes with respect to the expected execution behavior of the one or more processes. The qualitative deviation associated with the execution of the one or more processes may be measured in terms of an objective fitness metric. Exemplary deviations in the client execution of the one or more processes, which may be determined based on compliance analysis of the event log across the plurality of clients, are explained in conjunction with FIG. 8.

To perform the compliance analysis (both qualitative and quantitative), the analytics engine 210 may model an expected execution behavior of each process based on a process model associated with that process and/or a business rule (or decision rule) associated with the organization. The process model of the process may either be predefined for the organization and the predefined type of the plurality of clients, or may be determined at step 304a. On the other hand, the business rule (or the decision rule) may correspond to one or more pre-specified workflows and instructions associated with execution of a process of a particular type. The business rule (or the decision rule) may be used to check a control-flow or timing aspect of a process execution. Once the expected execution behavior of each process is modeled, the analytics engine 210 may use one or more replay techniques to perform the compliance analysis.

For instance, the analytics engine 210 may use a Petri-net (or a Declarative model-based) representation of a process model of each process to replay one or more process instances (or activities captured as events) associated with that process. The replay of the one or more process instances of the process based on the process model of the process may reveal deviations associated with execution of the process. The business rule (or the decision rule) may also be applied during the replay of the one or more process instances of the process to ascertain whether the process is conformant to the business constraints associated with the organization. Based on the process instance replay, the analytics engine 210 may determine deviations in terms of one or more quality metrics, such as fitness, precision, and generalization.

The fitness of a process may indicate how well the observed execution of the process resembles (or fits to a model of) the expected execution of the process (based on the process model of the process). Higher the degree of fitness of the process, closer is the observed execution of the process is to the expected execution of the process. Thus, such a process may be more conformant to the expected execution behavior of the process and may have lesser deviations. Further, the precision of each process may indicate whether the process is under-fitting (or an over-generalization/specialization of) the process model of that process. That is, the precision of a process may correspond to a ratio of an expected number of transitions to an observed number of transitions, among activities of the process, with respect to a given execution context. A prefix automation technique may be used to determine the precision of each of the one or more processes. In addition, the generalization of each process may indicate whether the process is over-fitting (or an under-generalization/specialization of) the process model of that process. The generalization of a process may correspond to a probability of uncovering a previously unvisited path of the process model of the process on occurrence of a new event in a particular state. The occurrence of various activities of a process in one or more states may be modeled by using a multinomial probability density function (PDF). Further, a Bayesian predictor may be applied over the multinomial PDF of the activities to determine a degree of generalization of the process.

A person with ordinary skill in the art may understand that steps 304b and 304c may be performed in parallel by the analytics engine 210. Further, the steps 304b and 304c may be combined as a single step, wherein compliance checking and performance checking may be performed at the same time. In another scenario, the sequence in which steps 304b and 304c are performed may be changed. That is, step 304c may be performed before step 304b.

Referring back to the flow chart 300 of FIG. 3A, at step 306, a set of root-causes associated with the process compliance deviation of the one or more processes may be determined. In an embodiment, the root cause diagnosis engine 212, under the control of the processor 202, may determine the set of root-causes associated with the process compliance deviations determined based on the qualitative and/or the quantitative compliance analysis of the event log (as per step 304c of FIG. 3B). That is, the process compliance deviation may correspond to a difference between the observed execution behavior and the expected execution behavior (qualitative and/or quantitative) of the one or more processes. The determination of the set of root-causes may be based on augmented business data associated with the organization. The augmented business data may include, but may not be limited to, one or more process models associated with the one or more processes and or decision rules associated with the organization. The augmented business data may further include an organizational structure associated with the organization and/or skill metrics of the one or more resources associated with the organization. In an embodiment, the root-cause diagnosis engine 212 may identify one or more features that may affect the execution behavior of each process based on a correlation analysis of the event data across the plurality of clients and the augmented business data. Based on the identified one or more features, the root-cause diagnosis engine 212 may formulate a problem-statement associated with the set of root-causes as a learning problem. Thereafter, the root-cause diagnosis engine 212 may determine a solution of the learning problem to determine the set of root-causes using one or more machine learning techniques. Examples of the one or more machine learning techniques may include, but are not limited to, decision trees, random forest search, regression trees, support vector machines (SVM), Bayesian techniques, genetic algorithm, or artificial neural networks (ANN).

For instance, for a particular process, a skill set level of the resources may be identified as one of the features that may affect the execution behavior of the process. Based on the correlation analysis, the skill set level of the resources may be found to closely influence a performance metric, such as average working time of the process. Accordingly, the root-cause diagnosis engine 212 may formulate a problem-statement to ascertain which one or more skills in the skill set of the resources is one of the root-causes for the deviation in the average working time of that process. Thereafter, a resource-skill matrix may be constructed based on the relevant augmented business data. Each cell (i,j) in the resource-skill matrix may capture proficiency level of a resource "i" in a skill "j." The resources may then be classified into different classes based on their proficiency on a variety of skills. Thus, each resource may be classified as proficient on a set of skills and novice in another set of skills. The root-cause diagnosis engine 212 may then apply a machine learning technique, such as decision trees, to learn discriminatory attributes between the various classes of skill efficiency in which the resources are classified. For example, skill set information of a group of resources who worked on tasks of a particular process may be filtered from the resource-skill matrix. Thereafter, based on a proficiency of the skills of the group of resources determined from the filtered resource-skill matrix, the group of resources may be categorized into various categories. Then, differentiating attributes may be ascertained across the group of resources categorized in the various skill proficiency categories. For instance, if resources of similar skill proficiency worked on the tasks of the process, the root-cause of longer working time on the tasks may be attributable to one or more employees who were staffed as ad-hoc resources on the tasks.

Once the set of root-causes is determined, the root-cause diagnosis engine 212 may also prioritize the set of root-causes based on a level of impact of each root-cause on the execution of each of the one or more processes. For instance, a root-cause of a deviation that may lead to a more severe non-compliance to the execution of a process may be prioritized above the other root-causes. The severity of non-conformance may be in terms of quantitative and qualitative metrics, as discussed in step 304c (with reference to the compliance analysis).

At step 308, one or more recommendations associated with client process execution of the one or more processes may be generated. In an embodiment, the recommendation engine 214, under the control of the processors 202, may be configured to generate the one or more recommendations associated with client process execution of the one or more processes based on the set of root-causes. In an embodiment, the recommendation engine 214 may generate at least one recommendation for each root-cause in the set of root-causes by use of the augmented business data. The client process execution of the one or more processes may be accordingly performed through the service delivery framework of the organization, based on the one or more recommendations, as described next.

For instance, the set of root-causes may include three root-causes. A first root-cause from the set of root-causes may indicate that the granularity at which activities of a process are defined may influence the complexity of the activities of the process. This may in-turn influence efficient execution of the process. For the first root-cause, the recommendation engine 214 may provide a recommended range of a level of granularity for the process, in accordance with an allowable process granularity value from the augmented business data. A second root-cause from the set of root-causes may indicate that experience and skill proficiency of resources may influence the working time of a process. For the second root-cause, the recommendation engine 214 may recommend that the experience and skill set of deployed resources should correspond to at least a minimum prescribed experience and skill set corresponding to the process, as per the augmented business data. For instance, a minimum of two years of work-experience in a relevant domain with a master's degree in that domain may be a prerequisite to be staffed on tasks of the process. Further, a third root-cause from the set of root-causes may indicate that ad-hoc resources may negatively impact the working time of a process. For the third root-cause, the recommendation engine 214 may recommend deployment of full-time (or dedicated) resources to the process for at least a predefined time (such as three months).

At step 310, the one or more generated recommendations may be presented to the user of the first user computing-device 106. In an embodiment, the processor 202 may be configured to present the one or more generated recommendations to the user of the first user computing-device 106. The processor 202 may transmit the one or more recommendations to the first user computing-device 106. The first user computing-device 106 may display the one or more recommendations to the first user, on a display screen of the first user computing-device 106, via a user interface of the first user computing-device 106.

At step 312, values may be assigned to one or more parameters associated with a client process execution of the one or more processes. In an embodiment, the processor 202 may be configured to assign the values to the one or more parameters associated with the client process execution of the one or more processes. Examples of the one or more parameters may include, but may not be limited to, a number of resources allocated to each process, a skill set of resources allocated to each process, a ratio of ad-hoc to permanent resources allocated to each process, a minimum duration of resource allocation to each process, and the like. A set of SLAs and/or a set of KPIs required to be achieved on an execution of each process may also be specified within the one or more parameters. In an embodiment, the assignment of the values may be performed either manually based on a user-input or automatically without any user-input. In the first case, the user-input may be received from the user of the first user computing-device 102. The processor 202 may prompt the user, via the user interface of the first user computing-device 106, to provide the values of the one or more parameters, for a simulated client process execution of the one or more processes. Thus, the values of the one or more parameters may be assigned based on the user-input received from the user of the first user computing-device 106. In the second case, the processor 202 may automatically assign the values to the one or more parameters based on at least the one or more recommendations for the execution of the one or more processes and/or the decision rules of the organization. The assignment of the one or more parameters may also be based on the other information in the augmented business data, such as the information pertaining to the organization structure and/or the skill metrics.

At step 314, a client process execution of the one or more processes may be simulated. In an embodiment, the processor 202 may be configured to simulate the client process execution of the one or more processes based on the values assigned to the one or more parameters and/or the one or more process models of the one or more processes. In an embodiment, the processor 202 may extract information associated with the service delivery framework and the augmented business data from the database server 108. Thereafter, the processor 202 may use the one or more parameters to model a client process execution of each process based on the one or more process models and other information from the augmented business data (for instance, decision rules). The information associated with the service delivery framework may include the decision rules associated with delivery of one or more services to the one or more clients of the organization. That is, the information associated with the service delivery framework may specify how the one or more processes executed by the organization may translate into the provisioning of the one or more services to the plurality of clients of the predefined type. Thus, client specific SLAs and KPIs (external or committed to the client) may be translated into organizational SLAs and KPIs (internal or committed within the organization), and vice versa, based on the information associated with the service delivery framework. During the simulation of the client process execution, the processor 202 may use the information associated with the service delivery framework to translate client specific KPIs and SLAs (that may be provided by the user or known based on the predefined type of the plurality of clients) to organizational SLAs and KPIs required to be met for each process. The organizational SLAs and KPIs may be used along with the one or more parameters for the simulation of the client process execution of the one or more processes. A person skilled in the art may understand that the organizational SLAs and KPIs may alternatively be specified by the user along with the other one or more parameters. In such a scenario, the information associated with the service delivery framework may not be required to be used to determine the organizational SLAs and KPIs.

Examples of the one or more techniques that may be used to simulate the client process execution of the one or more processes may include, but are not limited to, Monte Carlo simulation, Finite State Machine (FSM), and/or Support Vector Machine (SVM). In an embodiment, a result of the simulation may be presented as a visual workflow output with associated performance metrics to the user of the first user computing device 106, via the user interface of the first user computing-device 106. Thereafter, the user of the first user computing-device 106 may be prompted to provide input associated with another set of values of the one or more parameters. At this stage, the user may again consult the one or more recommendations and provide values of the one or more parameters according to the result of the simulation and the consulted recommendations. Alternatively, the processor 202 may automatically determine another set of values for the one or more parameters based on the one or more recommendations and the decision rules of the organization. On the basis of the another set of values of the one or more parameters, the processor 202 may run a new simulation of the client process execution of the one or more processes and present a new result to the user of the first user computing-device 106. This trial-and-run of the simulations may be iterated with different values of the one or more parameters to provide the user with a combination of results related to the client process execution of the one or more processes. The user may then select a preferred set of values of the one or more parameters associated with the client process execution of the one or more processes. The plurality of clients of the predefined type may then be serviced through the service delivery framework based the client process execution of the one or more processes, using the selected set of values of the one or more parameters.

Figure 4:
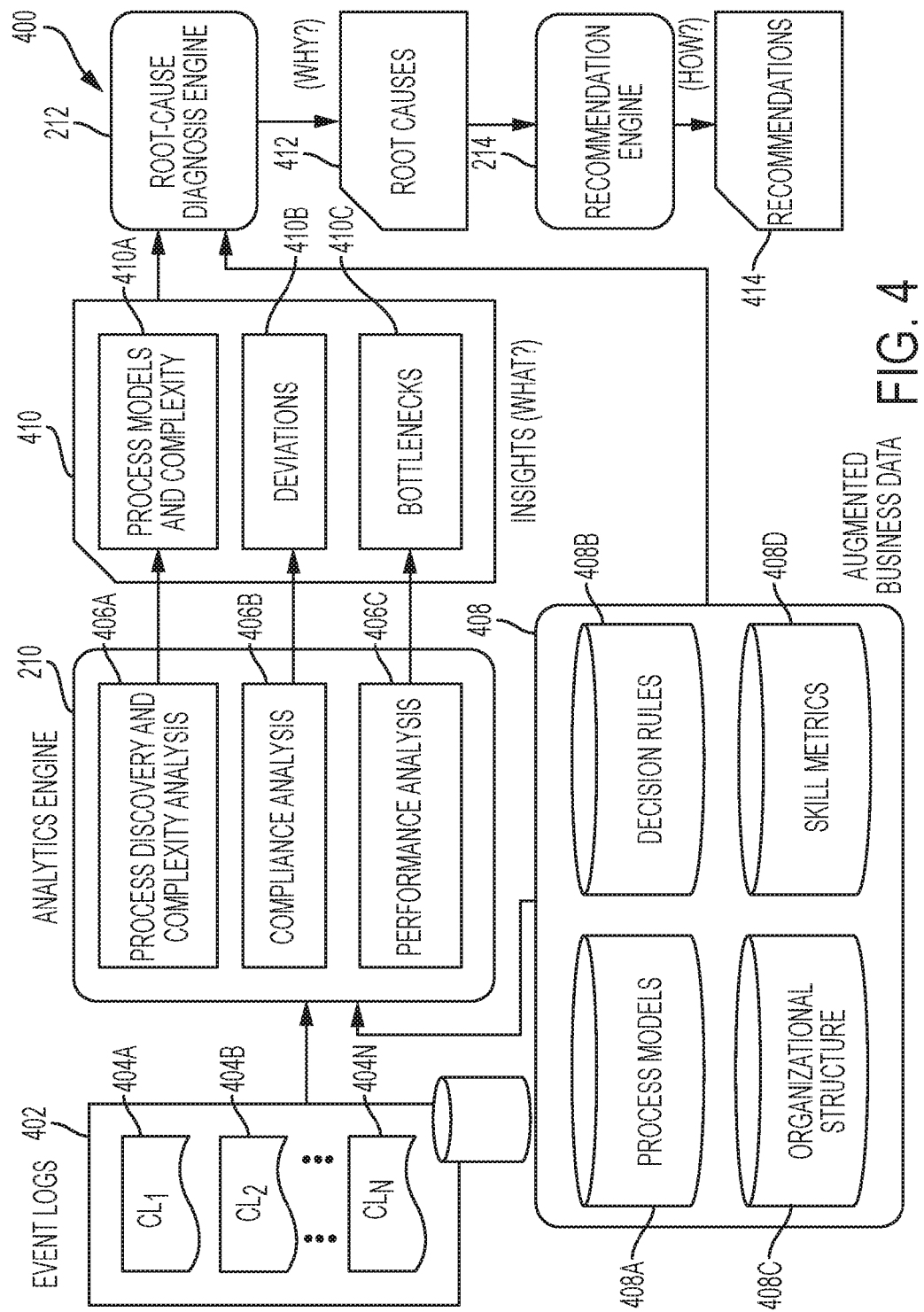
FIG. 4 is a flow diagram that illustrates a method for generating recommendations associated with client process execution in an organization, in accordance with at least one embodiment.

FIG. 4 is a flow diagram that illustrates a method for generating recommendations associated with client process execution in an organization, in accordance with at least one embodiment. With reference to FIG. 4, there is shown a flow diagram 400, which is explained in conjunction with FIGS. 1, 2, 3A, and 3B.

As shown in FIG. 4, the flow diagram 400 includes event logs 402, the analytics engine 210 (of FIG. 2), augmented business data 408, insights 410, the root-cause diagnosis engine 212 (of FIG. 2), root-causes 412, the recommendation engine 214 (of FIG. 2), and recommendations 414. The event logs 402 are shown to include event data associated with one or more process instances (case-log instances) such as $CL_1$ to $CL_N$. The flow diagram 400 further illustrates types of analysis performed by the analytics engine 210, such as process discovery and complexity analysis 406A, compliance analysis 406B, and performance analysis 406C. The insights 410 are shown to include process models and complexity 410A, deviations 410B, and bottlenecks 410C. Further, various types of augmented business data 408 are shown, such as process models 408A, decision rules 408B, organizational structure 408C, and skill metrics 408D.

The processor 202 of the application server 110 may extract event data associated with one or more processes executed to service the plurality of clients of the predefined type. For instance, the processor 202 may extract the event data associated with the process instances 404A (that is, $CL_1$) to 404N (that is, $CL_N$) from the event log 402 stored in the database server 108. The retrieval of the event data from the database server 108 is explained further in step 302 (of FIG. 3A). Post the retrieval of the event data, the analytics engine 210 may perform cross-clientele analysis, such as process discovery and complexity analysis 406A, compliance analysis 406B, and performance analysis 406C, of the retrieved event data across the plurality of clients of the predefined type to determine cross-clientele information. In an embodiment, the cross-clientele information may include the insights 410, which may be indicative of a "WHAT" aspect associated with a process execution of the one or more processes, across the plurality of clients. As shown, the insights 410 obtained by the cross-clientele analysis may include the process model and complexity 410A, the deviations 410B, and the bottlenecks 410C (of the one or more processes). In an embodiment, the analytics engine 210 may also use the augmented business data 408 during the cross-clientele analysis. The cross-clientele analysis is explained in detail in method step 304 of FIG. 3A.

Based on the process discovery and complexity analysis 406A, process models and complexity 410A (of the one or more processes) may be determined, as explained further in step 304a of FIG. 3B. The cross-clientele analysis performed by the analytics engine 210 may further include performing compliance analysis 406B of the retrieved event data across the plurality of clients. Based on the compliance analysis 406B, the deviations 410B (between the observed and the expected execution behavior of the one or more processes) may be determined. The compliance analysis 406B of the retrieved event data is explained in further detail in step 304c of FIG. 3B. In addition, the cross-clientele analysis performed by the analytics engine 210 may further include performing performance analysis 406C of the retrieved event data across the plurality of clients. Based on the performance analysis 406C, the bottlenecks 410B (of the one or more processes) and/or the observed performance metrics of the one or more processes (not shown in FIG. 4) may be determined. The performance analysis 406C of the retrieved event data is explained in further detail in step 304b of FIG. 3B.

In an embodiment, the insights 410 obtained from the analytics engine 210 and the augmented business data 408 may be communicated to the root-cause diagnosis engine 212. The root-cause diagnosis engine 212 may use the augmented business data 408 to determine the root-causes 412. The root-causes 412 may be indicative of a "WHY" aspect related to the obtained insights 410. The determination of the root-causes 412 by the root-cause diagnosis engine 212 is explained in further detail in step 306 of FIG. 3A. Further, the root-causes 412 may be communicated to the recommendation engine 214. The recommendation engine 214 may also receive the augmented business data 408 (though not shown in FIG. 4). Based on the root-causes 412, the recommendation engine 214 may generate recommendations 414 associated with a client process execution of the one or more processes. The recommendations 414 may be indicative of a "HOW" aspect of optimization of client process execution of the one or more processes though a service delivery framework of the organization. The generation of the recommendations 414 is explained in further detail in step 308 of FIG. 3A. Thereafter, the recommendations 414 may be presented to the user of the first user computing-device 106, as explained in step 310 of FIG. 3A.

Further, the processor 202 may simulate a client process execution of the one or more processes based on one or more parameters associated with the one or more processes. The one or more parameters may be assigned values based on user-input or automatically without any user input, as explained in step 312 of FIG. 3A. The simulation of the client process execution of the one or more processes may be based on the one or more parameters and one or more process models of the one or more processes, as explained in step 314 of FIG. 3A.

FIG. 5 illustrates an exemplary event log of one or more processes that may be executed in an organization to service a plurality of clients of a predefined type, in accordance with at least one embodiment. With reference to FIG. 5, there is shown an event log 500, which is explained in conjunction with FIGS. 1, 2, 3A, and 3B.

As shown in FIG. 5, the plurality of fields in the event log 500 may include a Case ID field 502, a Task ID field 504, a Type field 506, a Resource field 508, a Timestamp field 510, a Cost field 512, and a Revenue field 514. The event log 500 is explained with reference to event log entries related to a transaction bearing case ID "Case i." Examples of such event log entries include a first row 516a, a third row 516b, a fifth row 516c, a ninth row 516d, a tenth row 516e, an eleventh row 516f, and a twelfth row 516g of the event log 500.

The Case ID field 502 may store unique IDs assigned to each process or transaction, whereas the Task ID field 504 may store identification details related to each task in a process or transaction. The Type field 506 may denote a type of the log entry that corresponds to the current task in the process or transaction. The Resource field 508 may record a name of an employee or vendor who is assigned a particular task of a process or transaction. In some cases, the Resource field 508 may contain a value "System" for automatically performed tasks. Further, the Resource field 508 may contain a value "Admin" for tasks that may be performed by an Administrator (or task allocator). In addition, the Timestamp field 510 may record a date-time value that may correspond to a particular event log entry. The date-time values in the Timestamp field 510 may be useful to determine efficiency and productivity values of the resources and vendors associated with the organization. Further, the Cost field 512 and the Revenue field 514 may be additionally provided to record a cost incurred during performance of a task and revenue earned on performance of the task. The data in the Cost field 512 and the Revenue field 514 may be used for process costing, process revenue, and process earning calculations.

The Transaction bearing case ID as "Case i" (i.e., the $i^{th}$ process or transaction) is now explained as an exemplary transaction based on values of fields related to the "Case i" in the event log 500. The first row 516a of the event log 500 denotes a first entry related to the case ID "Case i." The Task ID field 504 has a value of "Transaction," while the Type field 506 has a value of "Start." Further, the Resource field 508 has a value of "System," the Timestamp field 510 has a value of "2016 Mar. 5 10:02:36 IST," while the Cost field 512 and Revenue field 514 have a value of "0 USD" each. Thus, the first row of the event log relates to a start of the transaction bearing case ID "Case i" by the System (or automatic start of the transaction). Further, the third row 516b of the event log 500 denotes that an "Admin" assigns the transaction with case ID "Case i" to one or more resources for processing and auditing. In addition, the fifth row 516c of the event log 500 captures an event related to a "start" of a "Transcription" task of the transaction with case ID "Case i" by a resource named "John" for a cost of "0.5 USD." Further, the ninth row 516d of the event log 500 denotes an event related to a completion of the "Transcription" task of the transaction with case ID "Case i" by "John," which may fetch revenue of "0.6 USD." Thus, the "Transcription" task is profit-making task of the transaction with case ID "Case i," bearing a profit of "0.1 USD."

As shown in the tenth row 516e of the event log 500, an "Audit" task of the transaction with case ID "Case i" may be started by a resource named "Mike" for a cost of "0.05 USD." Further, as per the eleventh row 516f of the event log 500, the "Audit" task of the transaction with case ID "Case i" may be completed by "Mike" fetching revenue of "0.02 USD." Thus, the "Audit" task is a loss-making task of the transaction with case ID "Case i," bearing a loss of "0.03 USD." However, the transaction with case ID "Case i" may be a profit making transaction with an overall profit of "0.07 USD" (i.e., 0.1 USD-0.03 USD). In addition, as per the twelfth row 516g of the event log 500, the transaction bearing the case ID "Case I" may be flagged as "Complete" by the "System." As may be evident from the event log 500, the Timestamp field 510 of the eleventh row 516f and twelfth row 516g may have the same value (i.e., "2016 Mar. 5 10:22:52 IST"). Thus, the transaction may be flagged as "Completed" by the "System" as soon as the Auditing of the transaction is completed (and no errors are detected or detected errors are rectified).

Figure 6:
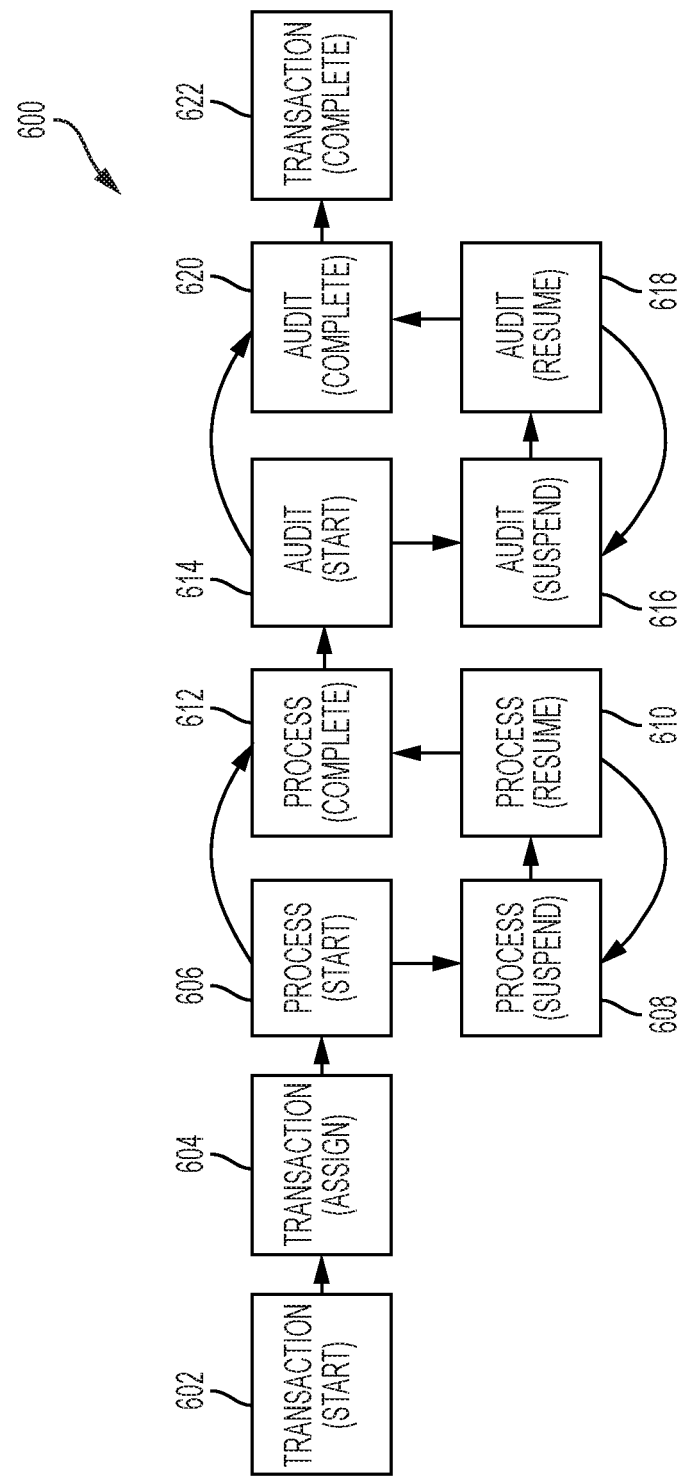
FIG. 6 illustrates an exemplary process model for transaction-based business processes of an organization, in accordance with at least one embodiment.

FIG. 6 illustrates an exemplary process model for transaction-based business processes of an organization, in accordance with at least one embodiment. With reference to FIG. 6, there is shown a process model 600, which is explained further in conjunction with FIGS. 1, 2, 3A, 3B, and 5.

In an embodiment, the process model 600 may represented using one or more process modeling techniques. Examples of the one or more process modeling techniques may include, but may not be limited to, Petri-nets, Event-driven Process Chain (EPC), Business Process Model and Notation (BPMN), heuristic-net, and/or other process modeling techniques known in the art. Each transaction may include performance of tasks of various types, which may transition a processing state of the transaction. Thus, the transaction based business processes may also be represented using Finite Automata State Machines (FSMs). As shown in FIG. 6, the process model 600 of a transaction may include a plurality of transaction states, a plurality of processing states, and a plurality of audit states. The plurality of transaction states may include a transaction start state 602, a transaction assign state 604, and a transaction complete state 622. Further, the plurality of processing states may include a process start state 606, a process suspend state 608, a process resume state 610, and a process complete state 612. In addition, the plurality of audit states may include an audit start state 614, an audit suspend state 616, an audit resume state 618, and an audit complete state 620.

The process model 600 may be defined such that a state transition may occur from a first state to a second state when a task that can trigger the state transition is performed or completed. The process model 600 is now explained from the initial state, that is, the transaction start state 602. At the transaction start state 602, a pending transaction, which has not yet been processed, may be selected for processing and flagged as started by the system (automatically). The transaction may be transitioned to the transaction assign state 604, when the transaction processing and auditing tasks are assigned to one or more resources associated with the organization. Thereafter, the transaction may be transitioned to the process start state 606, when the one or more resources commence work on the processing tasks of the transaction. In case a resource suspends work on an ongoing task of the transaction, the transaction for that task may be transitioned to the process suspend state 608. If one or more other tasks are still in progress, the transaction state for such ongoing tasks in progress may remain in process start state 606. Further, when the suspended task is resumed, the transaction for that resumed task may be transitioned to the process resume state 610. If the resumed task is re-suspended, the transaction for that re-suspended task may again be transitioned to the process suspend state 608 and may be re-transitioned back to the process resume state 608 when the task is resumed again. When the ongoing tasks or resumed tasks are completed, the transaction for such completed tasks may be transitioned to the process complete state 612. Further, when the transactions for all processing tasks of the transaction are completed, the transaction may automatically be transitioned to the audit start state 614 for all the tasks.

As may be evident from the process model 600 of FIG. 6, the state transitions among the plurality of process states and the plurality of audit states may occur in a similar manner. For instance, when the audit processing of one or more processed tasks is commenced, the transaction may be transitioned to the audit processing state 614 for such processed tasks. Further, on suspension of audit processing of a processed task, the transaction for such suspended audit processing task may be transitioned to the audit suspend state 616. Further, the transaction may be transitioned to audit resumed state 618, when the suspended audit processing task may be resumed. If the resumed audit processing task is re-suspended, the transaction for such re-suspended task may be transitioned back to the audit suspend state 616. Further, on completion of ongoing or resumed audit processing tasks, the transaction for such tasks may be transitioned to audit complete state 620. Thereafter, when audit processing of all the processed tasks is complete, the transaction may be automatically transitioned to the transaction complete state 622 for all the tasks.

Figure 7A:
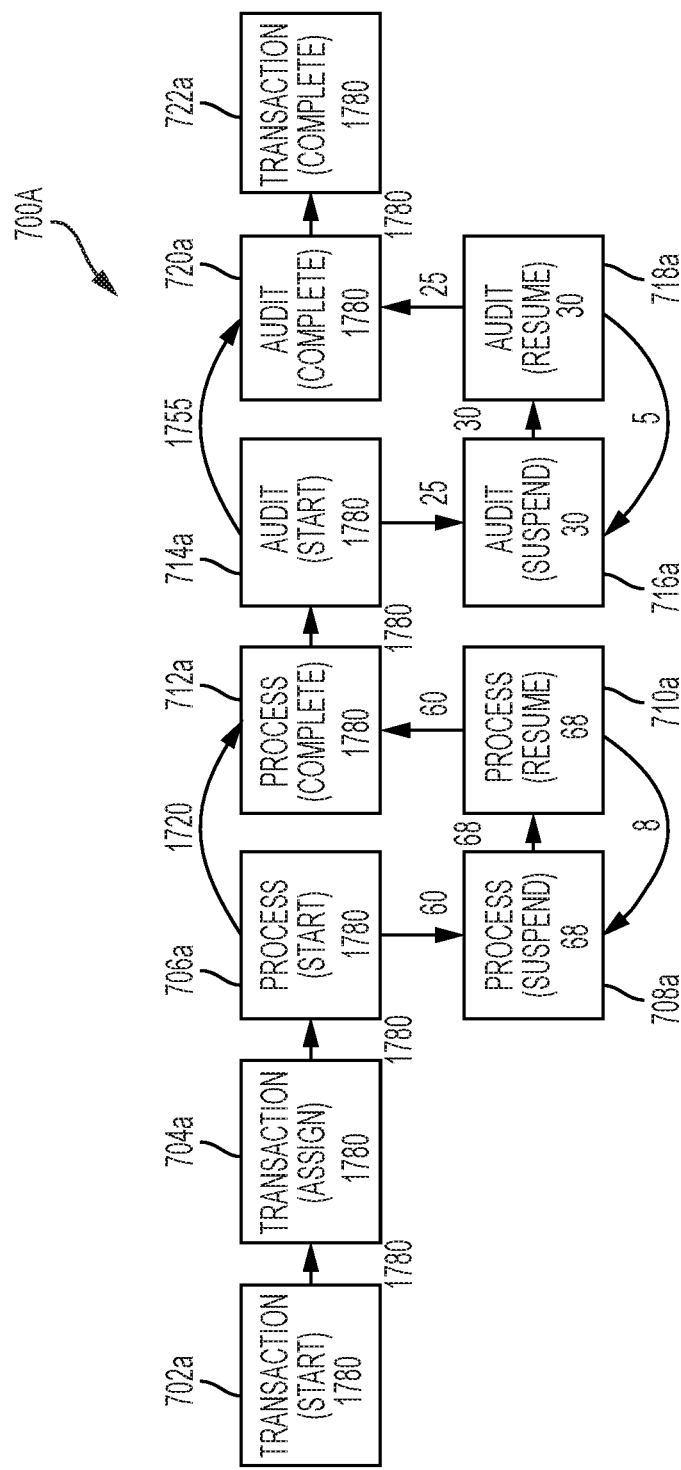
FIGS. 7A and 7B illustrate exemplary process models of a process across two different clients, which may be determined based on a cross-clientele analysis of an event log, in accordance with at least one embodiment.
Figure 7B:
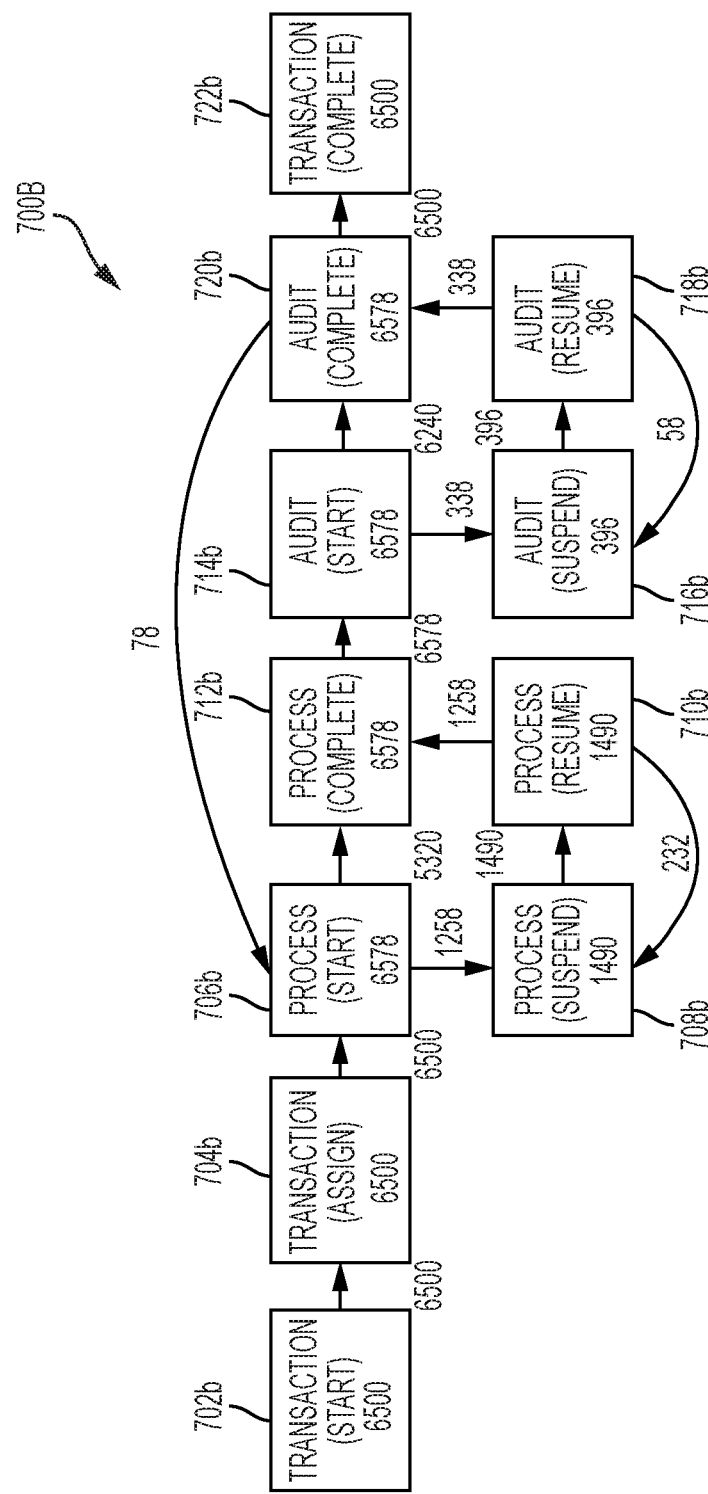

FIGS. 7A and 7B illustrate exemplary process models of a process across two different clients, which may be determined based on the cross-clientele analysis of the event log, in accordance with at least one embodiment. With reference to FIGS. 7A and 7B, a first process model 700A and a second process model 700B are shown. The first process model 700A and the second process model 700B are explained in conjunction with FIGS. 1, 2, 3A, 3B, and 6.

As may be evident from FIGS. 6, 7A and 7B, the first process model 700A and the second process model 700B may both resemble the process model 600. In accordance with an embodiment, the first process model 700A and the second process model 700B may represent a same transaction-based process executed by the organization to service a first client and a second client, respectively. The first process model 700A and the second process model 700B may be determined based on a cross-clientele analysis of the event log across the first client and the second client, in a manner similar to that described in FIGS. 3A and 3B.

With reference to FIG. 7A, it may be evident that out of a total of "1780" process instances, there were only "68" process instances of suspended tasks inclusive of "8" process instances of re-suspended tasks. Again, in case of "1780" audit tasks, there were only "30" suspended audit tasks inclusive of "5" re-suspended audit tasks. Further, there were no re-assignments of tasks for processing from the auditing stage. Hence, the execution of the process for the first client may have lesser errors with greater accuracy.

With reference to FIG. 7B, it may be evident that there were "1258" process instances of suspended tasks (exclusive of re-suspended tasks) out of "6500" process instances of initial tasks and "78" process instances of re-assigned tasks. Further, there were a substantial number of task re-suspensions (i.e., "232" tasks), which further raised the suspended task count to "1490." Similarly, in case of "6578" audit tasks, there were a significant number of task suspensions (i.e., "338" tasks) and re-suspensions (i.e., "58" tasks). The total task suspension count for audit tasks was "396" tasks. In addition, as may be evident from the process model 700B, after the auditing stage, "78" tasks were re-assigned for processing. This may be indicative of quality issues in the processing of the tasks and lower efficiency of the overall process due to re-work.

FIG. 8 illustrates exemplary deviations in the client process execution of the one or more processes, which may be determined based on compliance analysis of the event log across the plurality of clients, in accordance with an embodiment. With reference to FIG. 8, there are shown deviation insights 800, which are explained further in conjunction with FIGS. 1, 2, 3A, 3B, 6, 7A, and 7B.

In an embodiment, the deviation insights 800 may be determined based on the compliance analysis of the event log, as described in FIGS. 3A and 3B. As shown in FIG. 8, the deviation insights 800 may include a deviations field 802, a client-processes field 804, and a number of transactions field 806. The number of transactions in the number of transactions field 806 may be affected by the deviations (in the deviations field 802) across the client process pairs (in the client-processes field 804). For the sake of explanation, the event log is considered to include event data related to client process execution of four client processes P1, P2, P3, and P4 across an operational domain A. The event data of the four processes in the domain A is considered to be across four clients C1, C2, C3, and C4, which operate at least in the domain A. The deviation insights 800 are now explained.

As shown in FIG. 8, the first two deviations are related to assignment of transaction processing and auditing tasks to resources. Such deviations may be observed when a transaction processing task is assigned to different resources or a transaction auditing task is performed by different resources. Multiple resources working on a task, such as, when the task is re-assigned (or assigned in parallel to multiple resources), may lead to reduction in efficiency, re-work, and redundancy of effort. For instance, the processes P1 and P2 for the client C2 may experience the aforementioned deviations.

In addition, the third type of deviation evident from the deviation insights 800 may be performance of transaction auditing after the transaction is completed. This may lead to re-work and delay in delivering of results related to the process to the clients. For instance, clients C1, C2, and C4 may experience such a deviation in processes P2, P1, and P1, respectively. Further, another major type of deviation evident from the deviation insights 800 may be execution of transaction processing tasks more than once due to quality issues. During auditing of the transactions, errors may be identified in the executed transaction processing tasks. Some of the errors may be correctable during the auditing stage by the resources performing the auditing. However, certain errors may warrant a re-work on the transaction processing task. This may entail further processing time, delay in delivery of results to the client, escalation of processing cost, and reduction in process efficiency. As may be evident from the deviation insights 800, all four clients C1, C2, C3, and C4 may experience such deviation in one or more processes. Process P2 of client C4 may be affected by this deviation in 12 transactions, as shown in FIG. 8. Another type of deviation shown in the deviation insights 800 may correspond to abortion of transactions after resources complete transaction processing. This may be due to change in business requirements of a client. In many cases, this may not be controllable by the organization, as it may be due to a change on the client's end. However, making suitable provisions in the service delivery agreements by the organization may help the organization in minimizing losses incurred in such cases.

The disclosed embodiments encompass numerous advantages. The disclosure provides a method and system for generation of one or more recommendations for efficient execution of one or more processes in an organization. The one or more processes may be executed through a service delivery framework of the organization to provide one or more services to a plurality of clients of a predefined type. To generate the one or more recommendations, an event log including event data that captures information related to previous executions of the one or more processes may be analyzed across the plurality of clients of the predefined type. The cross-clientele analysis of the event log may yield cross-clientele information that may include statistics related to process models, process complexity, process compliance deviation between observed and expected client process execution of one or more processes, and/or process bottlenecks. The statistics associated with the cross-clientele information may act as useful insights to understand as to what are the trends associated with execution of the one or more processes across the plurality of clients. Such trends may be analyzed further and correlated with augmented business data of the organization, such as process models, decision rules, organizational structure, and/or skill matrices associated with the organization. Based on the correlation, root-causes associated with the trends (such as the process compliance deviations) associated with the cross-clientele information may be determined. The root-causes may be further used to generate the one or more recommendations for efficient execution of the one or more processes. Hence, based on the cross-clientele analysis of the event log of the one or more processes, the one or more recommendations may be generated for improvement of execution of the one or more processes.

Thus, the disclosure provides a holistic, data-driven framework for analysis of the event data of the event log across the plurality of clients to obtain the cross-clientele information. Key learning derived from an efficient execution of a process for a client may be leveraged for execution of that process for another client efficiently, based on the root-cause analysis of the cross-clientele information. The set of root-causes determined for various deviations related to the execution of one or more processes may be useful to track opportunities for improvement of client process execution. Further, the one or more recommendations may be used as such for improvement of execution of the processes. Alternatively, the recommendations may be used for simulation of client process execution of the one or more processes based on one or more parameters (selected by user or determined automatically based on the one or more recommendations). The result of the simulation may be used to assess ideal parameters for the one or more processes, which may lead to an efficient execution of the one or more processes.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for generation of recommendations associated with client process execution in an organization have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for recommending a client process execution based on event log data pertaining to execution of one or more client processes corresponding to a plurality of clients of an organization, the method comprising:
    retrieving, by one or more processors, an event log from a memory device, wherein the event log includes data associated with one or more events captured during execution of one or more processes in the organization, wherein the one or more processes correspond to services provided by the organization to the plurality of clients of a predefined type;
    analyzing, by the one or more processors, the retrieved event log across the plurality of clients of the predefined type to determine cross-clientele information associated with the one or more processes, wherein the cross-clientele information includes at least a process compliance deviation between an observed and an expected client process execution of the one or more processes;

determining, by the one or more processors, a set of root-causes associated with the process compliance deviation of the one or more processes based on at least one or more process models of the one or more processes and/or one or more decision rules associated with the organization, and based on a skill matrix associated with one or more resources associated with the organization;

generating, by the one or more processors, one or more recommendations for the client process execution of the one or more processes of the organization, based on the determined set of root-causes; and simulating, by the one or more processors, the client process execution of the one or more processes in the organization, based on one or more parameters associated with the one or more processes and one or more process models of the one or more processes, wherein the simulation is repeated using different values for the one or more parameters to yield a combination of results related to the client process execution of the one or more processes.

2. The method of claim 1, wherein each of the one or more processes correspond to a workflow including one or more ordered tasks performed by one or more resources associated with the organization to provide a service to at least one client.

3. The method of claim 1, wherein the predefined type corresponds to one or more of: a geographical region of operation of a client, one or more domains in which the client operates, a type of work that the client allocates to the organization, and/or a type of operational or functional relationship of the client and the organization.

4. The method of claim 1, wherein the cross-clientele information associated with the one or more processes further comprises one or more of the one or more process models, a process complexity associated with the one or more processes, one or more bottlenecks associated with the one or more processes, and/or observed values of one or more performance metrics associated with the one or more processes.

5. The method of claim 1, wherein the analysis of the retrieved event log further comprises one or more of: a process discovery analysis, a complexity analysis, a compliance analysis, and/or a performance analysis, associated with each of the one or more processes.

6. The method of claim 5 further comprising determining, by the one or more processors, the one or more process models of the one or more processes based on the process discovery analysis of the event log.

7. The method of claim 1 further comprising determining, by the one or more processors, the process compliance deviation based on the compliance analysis of the event log, wherein the process compliance deviation includes a deviation between expected and observed values of one or more of: one or more performance metrics, a control-flow related aspect, a data-related aspect, and/or a resource-related aspect of the client process execution of each of the one or more processes.

8. The method of claim 5 further comprising, determining, by the one or more processors, one or more process bottlenecks and/or observed values of one or more performance metrics, of each of the one or more processes, based on the performance analysis of the event log.

9. The method of claim 1, wherein the one or more process models of the one or more processes are pre-determined for the organization and the predefined type of the plurality of clients.

10. The method of claim 1, wherein the expected values of the one or more performance metrics is based on the one or more process models of the one or more processes and/or the predefined type of the plurality of clients.

11. The method of claim 1, wherein the one or more performance metrics correspond to one or more of a set of Key Performance Indicators (KPIs) associated with a client and/or a set of Service Level Agreements (SLAs) associated with the client.

12. The method of claim 1, wherein the set of root-causes is further determined based on an organizational structure of the organization.

13. The method of claim 1 further comprising receiving, by the one or more processors, the one or more parameters as a user input from a user, in response to a presentation of the generated one or more recommendations to the user.

14. The method of claim 1 further comprising determining, by the one or more processors, the one or more parameters based on the generated one or more recommendations and/or the one or more decision rules associated with the organization.

15. A system for recommending a client process execution based on event log data pertaining to execution of one or more client processes corresponding to a plurality of clients of an organization, the system comprising:

one or more processors configured to:

retrieve an event log from a memory device, wherein the event log includes data associated with one or more events captured during execution of one or more processes in the organization, wherein the one or more processes correspond to services provided by the organization to the plurality of clients of a predefined type;

analyze the retrieved event log across the plurality of clients of the predefined type to determine cross-clientele information associated with the one or more processes, wherein the cross-clientele information at least includes a process compliance deviation between an observed and an expected client process execution of the one or more processes;

determine a set of root-causes associated with the process compliance deviation of the one or more processes based on at least on one or more process models of the one or more processes and/or one or more decision rules associated with the organization, and based on a skill matrix associated with one or more resources associated with the organization;

generate one or more recommendations for the client process execution of the one or more processes of the organization, based on the determined set of root-causes; and simulate, by the one or more processors, the client process execution of the one or more processes in the organization, based on one or more parameters associated with the one or more processes and one or more process models of the one or more processes, wherein the simulation is repeated using different values for the one or more parameters to yield a combination of results related to the client process execution of the one or more processes.

16. The system of claim 15, wherein the cross-clientele information associated with the one or more processes further comprises one or more of: the one or more process models, a process complexity associated with the one or more processes, one or more bottlenecks associated with the one or more processes, and/or observed values of one or more performance metrics associated with the one or more processes.

17. The system of claim 15, wherein the analysis of the event log further comprises performance of one or more of: a process discovery analysis, a complexity analysis, a compliance analysis, and/or a performance analysis, associated with each of the one or more processes.

18. A computer program product for use with a computer, the computer program product comprising a non-transitory computer readable medium, wherein the non-transitory computer readable medium stores a computer program code for recommending a client process execution based on event log data pertaining to execution of one or more client processes corresponding to a plurality of clients of an organization, wherein the computer program code is executable by one or more processors to:
  retrieve an event log from a memory device, wherein the event log includes data associated with one or more events captured during execution of one or more processes in the organization, wherein the one or more processes correspond to services provided by the organization to the plurality of clients of a predefined type;
  analyze the retrieved event log across the plurality of clients of the predefined type to determine cross-clientele information associated with the one or more processes, wherein the cross-clientele information at least includes a process compliance deviation between an observed and an expected client process execution of the one or more processes;
  determine a set of root-causes associated with the process compliance deviation of the one or more processes based at least on one or more process models of the one or more processes and/or one or more decision rules associated with the organization, and based on a skill matrix associated with one or more resources associated with the organization;
  generate one or more recommendations for the client process execution of the one or more processes of the organization, based on the determined set of root-causes; and
  simulate, by the one or more processors, the client process execution of the one or more processes in the organization, based on one or more parameters associated with the one or more processes and one or more process models of the one or more processes, wherein the simulation is repeated using different values for the one or more parameters to yield a combination of results related to the client process execution of the one or more processes.

19. The method of claim 1, wherein the simulating comprises at least one of a Monte Carlo simulation, a Finite State Machine (FSM) simulation, and a Support Vector Machine (SVM) simulation.

20. The system of claim 15, wherein the simulating comprises at least one of a Monte Carlo simulation, a Finite State Machine (FSM) simulation, and a Support Vector Machine (SVM) simulation.

* * * * *